United States Patent
Boothby

(10) Patent No.: US 12,511,303 B1
(45) Date of Patent: Dec. 30, 2025

(54) SYSTEMS AND METHODS FOR DUAL-PATH PROCESSING OF TIME-BASED SERVICE RECORDS USING STRUCTURED METADATA AND THRESHOLD-BASED CONSTRAINT VALIDATION

(71) Applicant: Boothby Therapy Services, LLC, Laconia, NH (US)

(72) Inventor: Christopher D. Boothby, Laconia, NH (US)

(73) Assignee: Boothby Therapy Services, LLC, Laconia, NH (US)

( * ) Notice: Subject to any disclaimer, the term of this patent is extended or adjusted under 35 U.S.C. 154(b) by 0 days.

(21) Appl. No.: 19/240,370

(22) Filed: Jun. 17, 2025

(51) Int. Cl.
*G06F 16/2458* (2019.01)
*G06F 16/21* (2019.01)
*G06F 16/2457* (2019.01)

(52) U.S. Cl.
CPC ........ *G06F 16/2477* (2019.01); *G06F 16/211* (2019.01); *G06F 16/24573* (2019.01)

(58) Field of Classification Search
CPC . G06F 16/24573; G06F 16/211; G06Q 10/10; G06Q 40/08; G16H 15/00
See application file for complete search history.

(56) References Cited

U.S. PATENT DOCUMENTS

| | | | |
|---|---|---|---|
| 12,094,582 B1* | 9/2024 | Goyal | G06N 20/00 |
| 2008/0140453 A1 | 6/2008 | Poplinger et al. | |
| 2019/0371475 A1* | 12/2019 | Oliveira | G06N 5/01 |
| 2020/0286616 A1* | 9/2020 | Dunn | G06N 5/046 |
| 2021/0150448 A1* | 5/2021 | Gray | G06Q 10/063114 |
| 2022/0084664 A1* | 3/2022 | Ginsburg | G16H 15/00 |
| 2023/0196471 A1* | 6/2023 | Mendell | G06Q 40/08 705/4 |
| 2023/0253082 A1* | 8/2023 | Ginsburg | G16H 40/20 705/3 |

* cited by examiner

*Primary Examiner* — William P Bartlett
(74) *Attorney, Agent, or Firm* — Caldwell Intellectual Property Law

(57) ABSTRACT

A system including a computing device configured to receive a time-based service record, generate a structured metadata object for the service record, the structured metadata including a plurality of programmatically assigned descriptors selected from a configurable schema, instantiate a dual-path processing routine as a function of the programmatically assigned descriptors, retrieve a constraint profile comprising at least one temporal delivery threshold associated with the resource allocation output and the utilization performance evaluation, aggregate time-based service records over a reporting interval as a function of the structured metadata, compute, using a time-mapping module, a constraint deviation metric as a function of comparing the time-based service records and the temporal delivery threshold, and generate an output object as a function of the constraint deviation metric.

20 Claims, 9 Drawing Sheets

SYSTEMS AND METHODS FOR DUAL-PATH PROCESSING OF TIME-BASED SERVICE RECORDS USING STRUCTURED METADATA AND THRESHOLD-BASED CONSTRAINT VALIDATION

FIELD OF THE INVENTION

The present invention generally relates to the field of computer-implemented data processing systems. In particular, the present invention is directed to systems and methods for dual-path processing of time-based service records using structured metadata and threshold-based constraint validation.

BACKGROUND

Conventional data processing systems that manage time-based service records frequently operate as isolated modules, each designed to generate a singular class of output, such as financial summaries or activity logs. These architectures often lack a unified mechanism for routing structured data into distinct computational pipelines that support heterogeneous processing objectives. This limitation can result in state desynchronization, duplicated transformation logic, and inconsistency in output fidelity across systems. Moreover, such systems typically do not support real-time constraint validation over cumulative time-based data streams, impeding their ability to enforce delivery thresholds or detect deviations from expected service patterns within defined reporting intervals.

SUMMARY OF THE DISCLOSURE

In an aspect, a system for dual-path processing of time-based service records using structured metadata and threshold-based constraint validation includes at least a processor and a memory communicatively connected to the at least a processor, the memory containing instructions configuring the at least a processor to: receive, at a user interface, a time-based service record, generate a structured metadata object for the service record, the structured metadata including a plurality of programmatically assigned descriptors selected from a configurable schema, instantiate a dual-path processing routine, the dual-path processing routine configured to transmit the structured metadata object to a first processing module configured to compute a resource allocation output as a function of transformation logic defined in a precompiled configuration file and transmit the structured metadata object to a second processing module configured to evaluate utilization performance by applying a set of domain-specific normalization rules, retrieve a constraint profile comprising at least one temporal delivery threshold associated with the resource allocation output and the utilization performance evaluation, aggregate time-based service records over a reporting interval as a function of the structured metadata, compute, using a time-mapping module, a constraint deviation metric as a function of comparing the time-based service records and the temporal delivery threshold, and generate an output object as a function of the constraint deviation metric.

In another aspect, a method for dual-path processing of time-based service records using structured metadata and threshold-based constraint validation includes receiving, at a user interface, a time-based service record, generating, using at least a processor, a structured metadata object for the service record, the structured metadata including a plurality of programmatically assigned descriptors selected from a configurable schema, instantiating, using the at least a processor, a dual-path processing routine, the dual-path processing routine configured to transmit the structured metadata object to a first processing module configured to compute a resource allocation output as a function of transformation logic defined in a precompiled configuration file and transmit the structured metadata object to a second processing module configured to evaluate utilization performance by applying a set of domain-specific normalization rules, retrieving, using the at least a processor, a constraint profile comprising at least one temporal delivery threshold associated with the resource allocation output and the utilization performance evaluation, aggregating, using the at least a processor, time-based service records over a reporting interval as a function of the structured metadata, computing, using a time-mapping module, a constraint deviation metric as a function of comparing the time-based service records and the temporal delivery threshold, and generating, using the at least a processor, an output object as a function of the constraint deviation metric.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for dual-path processing of time-based service records using structured metadata and threshold-based constraint validation. In an embodiment, a computing system receives a time-based service record at a user interface, programmatically generates a structured metadata object for the record based on a configurable schema, and instantiates a dual-path processing routine that routes the metadata object to two distinct processing modules: a first module configured to compute a resource allocation output using transformation logic defined in a precompiled configuration file, and a second module configured to evaluate utilization performance using a set of domain-specific normalization rules.

Aspects of the present disclosure can be used to support real-time or retrospective evaluation of service delivery against system-defined temporal delivery thresholds, such as minimum required durations over a weekly or annual reporting interval. Aspects of the present disclosure can also be used to dynamically categorize and normalize service records for multi-domain analysis, including but not limited to allocation tracking, utilization scoring, and deviation detection. This is so, at least in part, because the system implements a time-mapping module that aggregates time-based service records as a function of structured metadata and computes a constraint deviation metric relative to a constraint profile comprising delivery expectations. In certain embodiments, the output of this process may include machine-readable indicators reflecting delivery conformance, distribution variance, or scheduling irregularities.

Aspects of the present disclosure allow for technically robust, schema-driven routing and evaluation of structured service data across distinct computational workflows. This includes real-time feedback, historical trend analysis, and automated constraint validation without requiring manual reconciliation of financial and performance data streams. Exemplary embodiments illustrating aspects of the present disclosure are described below in the context of several specific examples. Exemplary embodiments illustrating aspects of the present disclosure are described below in the context of several specific examples.

Figure 1:
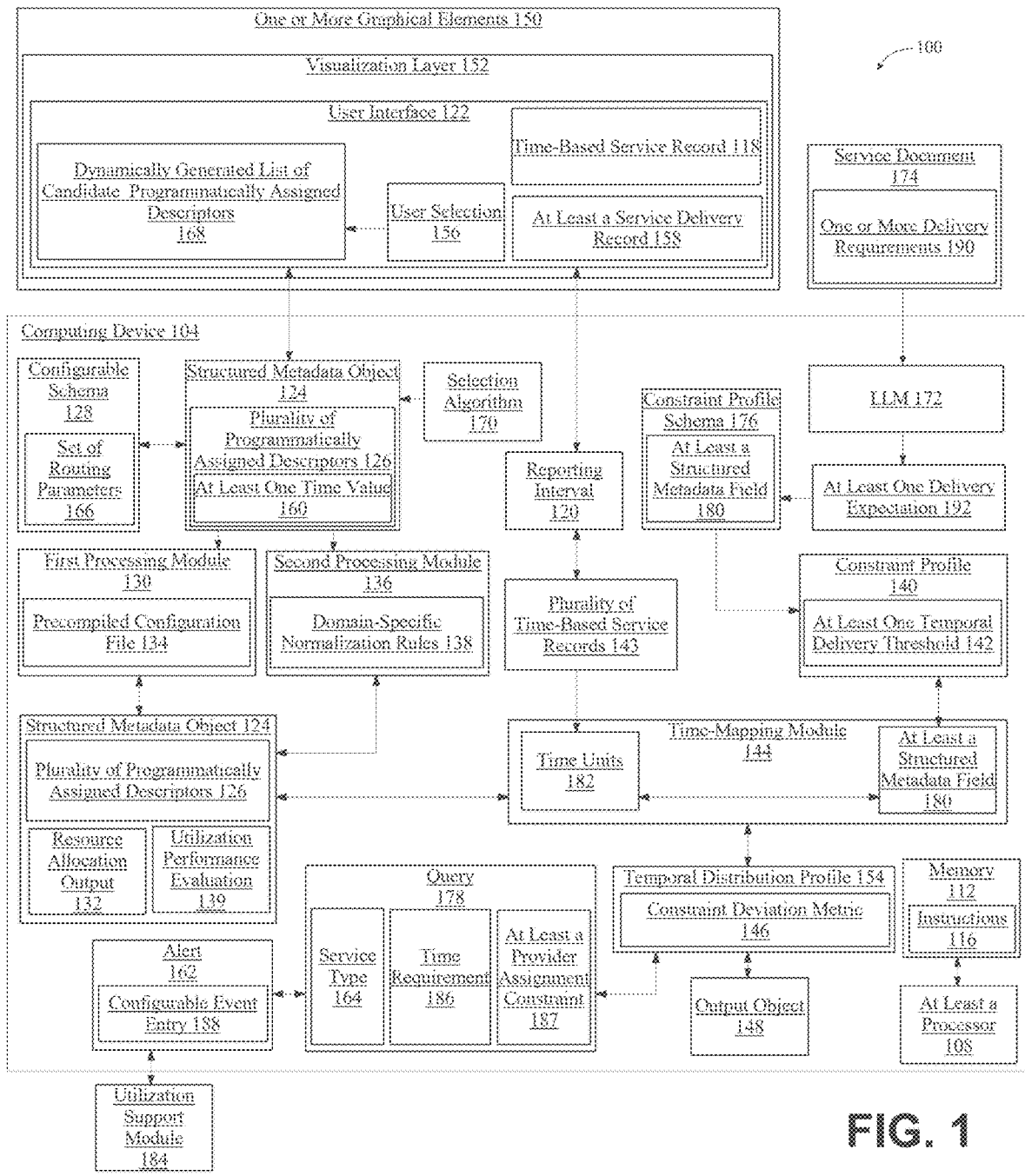
FIG. 1 is a block diagram of an exemplary system for dual-path processing of time-based service records using structured metadata and threshold-based constraint validation.

Referring now to FIG. 1, an exemplary embodiment of system 100 for dual-path processing of time-based service records 118 using structured metadata and threshold-based constraint validation is illustrated. For purposes of this disclosure, "dual-path processing" is a computational framework wherein a unified input object is routed to at least two independently operating processing modules, each executing a distinct transformation logic pipeline in parallel or in a selectively sequenced manner. Each module may be configured to generate a unique system output, such as a resource allocation output (e.g., billing or reimbursement-ready financial data) and a utilization performance evaluation (e.g., compliance with delivery thresholds, policy alignment, or contract mandates). System 100 may include circuitry such as without limitation at least a processor 108 communicatively connected to a memory 112, the memory 112 containing instructions 116 configuring the at least a processor 108 to complete tasks as described herein; for instance, circuitry may include and/or be included in a computing device 104. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In continued reference to FIG. 1, in an embodiment, at least a processor 108 is configured to receive, at a user interface 122, a time-based service record 118. For purposes of this disclosure, a "user interface" is the point of interaction through which data is communicated to the system. This may include communication by a human user, an automated agent, and/or an external system. The user interface 122 may include, without limitation, any graphical, textual, auditory, or programmatic mechanism configured to facilitate the exchange or submission of data. In various embodiments, the user interface 122 may comprise application screens, web portals, forms, machine-readable endpoints, background processes integrated using APIs or file uploads, or any other mode of input through which data may be entered, transmitted, or relayed to the system. In some embodiments, the user interface 122 may include a graphical user interface (GUI), such as an application screen, web-based dashboard, or embedded software panel rendered on a computing device. The GUI may be configured to display time-entry fields, selectable menus, dynamic data tables, notification elements, and visual indicators related to service activity, compliance thresholds, or metadata status. The GUI may further support user actions such as manual entry, data correction, bulk uploads, and interaction with historical records. In certain implementations, the GUI may be context-aware, role-based, or dynamically configurable according to organizational policy, user credentials, or record type.

In continued reference to FIG. 1, in an embodiment, the user interface 122 may additionally include instrumentalities such as input validation components, autofill engines, metadata suggestion modules, and record integrity checks. These components may operate in real time or asynchronously to enhance data quality, enforce schema conformance, or prepare records for downstream processing. In other embodiments, the user interface 122 may be non-graphical, such as an application programming interface (API), a command-line utility, a message queue listener, or an automated file monitoring service configured to accept structured data files (e.g., CSV, XML, JSON) uploaded or transmitted from external systems.

With continued reference to FIG. 1, in an embodiment, the user interface 122 may be further configured to support visualization and user interaction with temporally organized service data. In some embodiments, the user interface 122 may be configured to display, using one or more graphical elements 150, a visualization layer 152 comprising a temporal service distribution profile spanning the reporting interval 120. For purposes of this disclosure, the visualization layer 152 may include charts, calendars, timelines, or heatmaps depicting the quantity, frequency, and distribution of service-related activities over a bounded time span. These graphical elements may correspond to entries within a temporal distribution profile 154 generated by the time-mapping module 144 and may be stratified by structured metadata fields such as provider type, funding source, or service category. The user interface 122 may further be configured to receive a user selection 156 of a graphical segment corresponding to a particular time-based service record 118, such as clicking on a specific day on a calendar heatmap or selecting a bar in a histogram. In response to the user selection 156, system 100 may surface at least a service delivery record 158 associated with the particular time-based service record 118, enabling detailed inspection of session attributes, provider assignment, and compliance indicators. This functionality may support administrative review, audit validation, or supervisory decision-making and may include features such as record highlighting, contextual menus, or dynamic filtering based on descriptor fields.

Still referring to FIG. 1, for purposes of this disclosure, a "time-based service record" is any digital object, structured message, or data record that includes information indicative of a time or time span associated with a service-related activity. For purposes of this disclosure, a "service-related activity" is any interaction, engagement, or operation carried out by a service provider, agent, or system on behalf of a recipient, client, or operational objective. In an embodiment, the service-related activity may be scheduled or unscheduled, direct or indirect, and may be performed in-person, virtually, or through automated mechanisms.

In continued reference to FIG. 1, in an embodiment, service-related activities may span a wide range of domains, including but not limited to healthcare and behavioral health services (e.g., therapy sessions, wellness check-ins, in-home visits, medication administration, or patient intake assessments), educational services (e.g., tutoring, instructional support, classroom aid, or individualized learning sessions), social or human services (e.g., case management, benefits counseling, community outreach, or housing navigation), operational or logistical support (e.g., transportation coordination, equipment delivery, technical maintenance, or on-site inspection), administrative functions (e.g., billing preparation, supervision, training, or compliance audits), and digital or telepresence services (e.g., telehealth appointments, remote diagnostics, or AI-assisted consultations). Each such activity may generate or be associated with a time-based service record 118 containing time indicators and descriptive data for tracking, validation, billing, compliance, or performance analysis.

In further reference to FIG. 1, in an embodiment, the time-based service record 118 may include explicit temporal fields (e.g., start time, end time, duration, timestamp), or infer timing from contextual information. For example, a time-based service record 118 may reference a scheduled appointment identifier, calendar block, or shift assignment that has a known time range stored elsewhere in the system. In other cases, system 100 may infer timing based on system-generated logs (e.g., a login or access timestamp, digital signature event, or GPS check-in), metadata tags embedded in uploaded documentation (e.g., a scanned service note with embedded creation timestamps), or temporal correlation with other records (e.g., adjacent service entries, batch-submitted session logs, or sequential workflow events). Timing may also be derived through heuristic or probabilistic inference based on historical patterns or organizational rules, such as assumed default durations for specific service types 164, or inferred start times based on standard shift schedules. These contextual cues allow system 100 to construct a time representation sufficient for processing and validation, even when direct time fields are unavailable or ambiguous.

In continued reference to FIG. 1, in an embodiment, at least a processor 108 may be further configured to determine at least one time value 160 associated with the time-based service record 118 as a function of executing a timestamp resolution routing. For purposes of this disclosure, a "time value" is a computable representation of when a service-related activity occurred or is presumed to have occurred. For example, a time value may include a start time, end time, timestamp, time window, or derived duration. A time value may be represented in absolute format (e.g., UNIX timestamp, ISO 8601 date-time string) or relative format (e.g., offset from a known temporal anchor such as a shift start or login event). In an embodiment, the timestamp resolution routine may include a logic-driven or learned process that attempts to resolve ambiguities or fill gaps in time-based service records 118 by identifying and selecting the most probable time value from among available data sources. This may include applying priority logic, rule hierarchies, or confidence scoring models.

In further reference to FIG. 1, in an embodiment, the timestamp resolution routine may select the time value as a function of at least a data source containing machine-readable data including a temporal association between a service-related activity and at least one stored system datum. As used herein, a "data source" may include system-accessible storage or third-party integrations that contain logs, schedules, or metadata. For purposes of this disclosure, "metadata" is structured information that describes, categorizes, or augments other data to facilitate interpretation, processing, or routing. Metadata may include, without limitation, descriptive attributes, timestamps, source identifiers, semantic tags, programmatically assigned descriptors, or normalization status indicators. For example, in a time-based service record, metadata may comprise fields such as session start time, service type, provider role, funding source, or delivery location. In various embodiments, metadata may be extracted from raw service entries, inferred from contextual inputs, or generated during preprocessing steps, such as during the formation of a structured metadata object. Metadata may be used by one or more system modules to support downstream operations, including rule selection, record classification, constraint evaluation, aggregation, and visualization. In some implementations, metadata fields may also carry versioning tags, confidence scores, or audit provenance markers to enhance traceability and data fidelity across the processing lifecycle. Non-limiting examples of a data source may include electronic health records (EHR), calendar systems, access control logs, GPS check-ins, staff shift assignments, service note timestamps, or form submission logs. A "temporal association," for purposes of this disclosure, is a link between a service-related activity and a known or computable time anchor. This association may be implicit (e.g., inferred from overlapping entries or co-occurrence in the same data structure) or explicit (e.g., annotated via a timestamp field or audit log entry). For instance, a digital form submitted at 2:04 PM referencing a client visit may form a temporal association between the visit and the timestamp of the submission. For purposes of this disclosure, a "stored system datum" is any previously recorded data point within the system's database or accessible sources that may be used to assist in resolving a time value. Examples include a logged digital signature, a pre-scheduled appointment block, a provider login time, a scanned document creation timestamp, or metadata from structured records (e.g., service note version history, billing log entry). In some implementations, the timestamp resolution routine may be triggered conditionally, such as when a submitted service record lacks an explicit timestamp and may attempt to cross-reference the record against one or more structured metadata fields (e.g., provider ID, session type, client ID) to locate plausible stored system data with a matching temporal association. The resolved time value may then be stored in the structured metadata object 124, used to determine bin assignment during reporting interval 120 aggregation, or flagged with a provenance indicator reflecting how the time was inferred.

With continued reference to FIG. 1, in some embodiments, the timestamp resolution routine may be implemented using a hierarchical logic structure including a prioritized rule set. Each rule in the hierarchy may define a preferred data source, confidence threshold, or validation condition that must be satisfied before a time value is selected. For example, system 100 may be configured to first check for an explicit timestamp within the time-based service record 118 itself. If absent, system 100 may next check for a matching scheduled appointment in a linked calendar system, followed by a search for a check-in log, and finally attempt inference from form metadata such as creation timestamps or last modification time. This cascading logic may enable system 100 to resolve time values in a deterministic and reproducible manner, while providing transparency in the provenance of the selected time.

In continued reference to FIG. 1, in other embodiments, system 100 may employ pattern recognition algorithms, such as a trained machine-learning model (e.g., decision tree, ensemble classifier, or neural network), that can predict or select a probable time value based on contextual features. These features may include metadata fields (e.g., session type, provider ID, record length), temporal history (e.g., typical service durations, past scheduling behavior), or external variables (e.g., known shift assignments, office hours). For instance, a model may learn that speech therapy sessions for a given provider generally start at 9:00 AM on Mondays and may assign that as the default time in the absence of explicit data. Hybrid implementations may combine deterministic rule logic with learned prioritization weights, enabling flexible and domain-specific time resolution while preserving traceability and auditability of inferred timestamps.

Still referring to FIG. 1, in either implementation, the selected time value may be flagged with a resolution status indicator (e.g., "explicit," "matched from calendar," "inferred with confidence score X"), which is stored in the structured metadata object 124 to support downstream decision-making, such as conflict resolution, constraint validation, or user override review using the user interface 122. This structured resolution pipeline may ensure consistency across time-based data ingestion, particularly in environments with incomplete or inconsistently formatted records. In some embodiments, rather than directly assigning the inferred time value, system 100 may generate an alert 162 that surfaces to a designated user or administrator, prompting confirmation that the service-related activity actually occurred. This alert 162 may require manual acceptance or override before the time-based service record 118 is considered finalized and eligible for downstream processing such as billing or utilization logging. This verification mechanism may provide a safeguard against incorrectly logging or billing events that were inferred but not completed, enhancing data fidelity and regulatory compliance in service delivery environments.

With further reference to FIG. 1, in an embodiment, service records may include associated data fields that provide additional context or operational relevance beyond the timing indicators. These fields may include, but are not limited to, a service type 164 identifier indicating the classification or category of the service performed (e.g., behavioral therapy, educational assessment, technical inspection), a personnel identifier referencing the individual or team responsible for delivering the service, and a location code designating the physical, virtual, or organizational site at which the service occurred. In some embodiments, the service record may further include a client identifier associated with the recipient of the service, which may be anonymized or encrypted in accordance with privacy or regulatory requirements. Additional fields may include one or more authorization references, such as billing codes, prior-approval IDs, or regulatory compliance markers that confirm the service was pre-approved or qualifies under a specific operational constraint. In other embodiments, service records may carry funding source metadata, which may identify the programmatic, institutional, or payer source of funds responsible for compensating or allocating resources to the service. This metadata may be used downstream for routing logic, resource accounting, or eligibility validation. Still further, the record may optionally include a service outcome indicator, a data integrity checksum, a record origin tag (e.g., manually entered, imported, system-generated), and temporal scope indicators (e.g., shift category, daypart classification, or interval labels) which may be useful for scheduling, aggregation, or compliance evaluation. These fields, when processed as part of a structured metadata object 124, support rich configurability and enable system 100 to assign dual-path processing logic, perform constraint validation, and generate actionable output objects 148 aligned with operational, financial, and compliance objectives. Upon receipt of the time-based service record 118 using the user interface 122, system 100 may initiate a metadata generation routine and instantiate dual-path processing workflows, thereby transforming the received record into a structured format suitable for resource allocation analysis and utilization performance validation.

With further reference to FIG. 1, in an embodiment, at least a processor 108 is configured to generate a structured metadata object 124 for the service record. For purposes of this disclosure, a "structured metadata object" is a data construct, comprising metadata, derived from one or more fields of a time-based service record 118. In some cases, the structured metadata object 124 may be optionally supplemented by system-inferred and/or user-supplied metadata and formatted according to a predefined schema that supports downstream computational workflows. As used herein, "system-inferred metadata" refers to data elements or descriptors generated by the system without direct user input. This may be accomplished, for example, by analyzing characteristics of the incoming time-based service record 118 or by applying logic, heuristics, or machine learning models. For example, if a service record includes a timestamp of 7:30 PM, system 100 may infer and assign a descriptor indicating "evening shift." Similarly, if the service location is marked as "telehealth platform," system 100 may automatically tag the session as "virtual" or "remote." In contrast, "user-supplied metadata," for purposes of this disclosure, refers to information explicitly entered or confirmed by a user through the user interface 122. This may include freeform fields (e.g., case notes or session outcomes), selected values from dropdown menus (e.g., selecting "group therapy" from a list of service types 164), or confirmations of system-inferred tags (e.g., approving or modifying a proposed funding source). In some cases, user-supplied metadata may be required for validation or override purposes, particularly in domains where human review is mandated for compliance. The metadata—whether inferred or supplied—may be formatted according to a "predefined schema," which, as used herein, refers to a structured organizational model that defines the set of fields, descriptor categories, and accepted values used to represent service record information across system 100. For instance, the predefined schema may specify that the field "service_mode" must include one value from a limited set such as {in-person, virtual, hybrid}, or that "funding_stream" must be selected from a list of organization-defined payer sources. The predefined schema may ensure consistency and compatibility across processing modules, allowing dual-path logic to operate on standardized metadata regardless of how it was initially sourced. As discussed further below, the structured metadata object 124 may also include a plurality of programmatically assigned descriptors 126 that reflect key characteristics of the time-based service record 118 and are selected based on a configurable schema 128.

With further reference to FIG. 1, in an embodiment, the structured metadata object 124 may provide a normalized representation of key attributes associated with a service-related activity, such as its type, timing, personnel, setting, purpose, or associated constraints. In some embodiments, the structured metadata object 124 may be implemented as a key-value map, a JSON object, a relational database row, an XML element tree, or any other suitable data structure capable of maintaining field-label associations. In an embodiment, the structured metadata object 124 may include a plurality of programmatically assigned descriptors 126. For purposes of this disclosure, a "programmatically assigned descriptor" refers to a data tag, label, classification, or attribute assigned to the service record by the system through logic-based or learned rules. In an embodiment, programmatically assigned descriptors may represent semantic or operational characteristics of the service record, such as "in-home visit," "group session," "Medicaid-funded," "synchronous virtual," or "standard 60-minute authorization." Programmatically assigned descriptors may be assigned based on one or more factors, including record content (e.g., matching a service type 164 code to a standardized category), temporal data (e.g., inferring shift classification based on time), user role, record provenance, or context derived from system history or organizational configuration. Each programmatically assigned descriptor may be selected from a configurable schema 128. As used herein, a "configurable schema" refers to a structured, but customizable, set of available descriptor categories and values that define the metadata structure recognized by the system. The configurable schema 128 may include enumerated descriptor types (e.g., service delivery mode, funding source, clinical domain), each with a set of permissible values or selection criteria. In an embodiment the configurable schema 128 may be extensible or restricted depending on implementation constraints and organizational policy. In some embodiments, the configurable schema 128 may be defined globally at the system level; in others, it may be organization-specific or contextually scoped.

In continued reference to FIG. 1, in some embodiments, the configurable schema 128 may include a set of routing parameters 166, and the programmatically assigned descriptors of the structured metadata object 124 may control a selection of the first processing module 130 and second processing module 136 as a function of the set of routing parameters 166. As used herein, "routing parameters" refer to configuration values within the configurable schema 128 that determine how a structured metadata object 124 is distributed to one or more processing modules within the system. In an embodiment, routing parameters may act as decision criteria or control variables that govern whether a service record is transmitted to the first processing module 130 (for generating a resource allocation output 132), the second processing module 136 (for evaluating utilization performance), or both. In some embodiments, routing parameters may include descriptor-to-path mappings, priority rules, service type 164 classifications, funding source identifiers, delivery mode indicators, or thresholds for triggering delayed or conditional processing. For example, a descriptor indicating "Medicaid-funded" may trigger routing to a transformation logic module tailored for state-specific billing formats, while a descriptor indicating "supervision required" may invoke a utilization analysis routine configured to validate delivery against supervisory thresholds. In another example, a routing parameter may dictate that services below a 15-minute duration threshold be excluded from immediate resource allocation processing and held for batch review in a retrospective utilization audit. This routing mechanism enables system 100 to dynamically select appropriate processing paths for a given record, based on the structured descriptors derived from the record itself. In some embodiments, routing logic may further support conditional or deferred processing. That is, a given structured metadata object 124 may be routed to only one of the first processing module 130 or second processing module 136 initially, while retaining sufficient tagging to enable later processing by the other module at a future time. For example, a time-based service record 118 may be processed for resource allocation upon submission, while its utilization performance evaluation 139 is deferred until a full reporting interval 120 has elapsed. Alternatively, metadata may be stored in association with the routing parameters to enable batch processing, audit reconciliation, or retrospective analysis across either or both modules.

In further reference to FIG. 1, in an embodiment, the process of "selecting from" the schema may be fully automatic, manual, or a hybrid of both. For example, programmatically assigned descriptors may be automatically selected by system 100 based on a pattern-matching algorithm, a trained classifier, or deterministic rules applied to the structured metadata object 124 derived from the time-based service record 118. For purposes of this disclosure, the descriptor selection logic is a computational process that evaluates the structured metadata object 124, which includes a set of normalized attributes such as service type 164, duration, provider ID, modality, and session context, and maps those attributes to predefined descriptor categories within a configurable schema 128. The logic may include one or more of the following: (i) rule-based mapping functions (e.g., if service duration >60 minutes and modality="virtual", then assign descriptor "long-form telehealth"), (ii) vector similarity comparisons (e.g., cosine similarity between record feature embeddings and descriptor prototypes), or (iii) classifier outputs (e.g., using a random forest or neural network trained to assign descriptors based on structured inputs). The descriptor selection logic may also score candidates by relevance, which may reflect semantic alignment, statistical confidence, or historical usage frequency.

Alternatively, in a hybrid implementation, the user interface 122 may present a dynamically generated list of candidate programmatically assigned descriptors 168. Generating the list may include applying a descriptor selection algorithm 170 to the structured metadata object 124 to retrieve and rank relevant descriptors. These descriptors may be surfaced with ranked confidence scores, a visual indicator of the match quality, and optional explanatory text generated by a rules engine or LLM 172 for transparency. The interface may further include a manual search field as a fail-safe, enabling a user to select or override the suggestions. Upon receiving a user selection 156 at the user interface 122, system 100 may update the structured metadata object 124 to reflect the confirmed descriptors. This process may preserve traceability by tagging the source of each descriptor (e.g., "system-assigned," "user-confirmed," "user-modified"), enabling auditability and downstream logic tuning. This hybrid architecture supports both automated scalability and human-in-the-loop control, offering operational flexibility across domains with varying compliance or data integrity requirements.

With continued reference to FIG. 1, in further embodiments, the automatic selection of programmatically assigned descriptors may be accomplished using either system-defined logic or machine learning-based inference engines, depending on implementation context and data availability. For example, in rule-based implementations, system 100 may apply a set of deterministic conditions or hierarchical decision trees that map input record fields to descriptor values. Such logic may include if-then constructs, regular expression matching, lookup tables, or field cross-validation rules. As one illustrative example, if a time-based service record 118 includes a service code of "H2019" and a duration between 50 and 60 minutes, the system may deterministically assign the descriptors "individual behavioral health session" and "standard 60-minute authorization." These rules may be configurable at the organizational level or maintained globally for uniformity.

In further reference to FIG. 1, in other embodiments, system 100 may utilize a machine-learning model trained on historical service records and associated metadata to predict one or more appropriate descriptors. Such models may include supervised classifiers (e.g., logistic regression, random forests, neural networks) trained on labeled data, or unsupervised or semi-supervised models that cluster or embed records into a semantic space for similarity-based inference. Features used for inference may include structured fields (e.g., service type 164, location, timestamp), as well as derived features (e.g., frequency of similar records, temporal patterns, role-specific usage history). The system may expose confidence scores for each suggested descriptor and allow rules-based fallback logic or user confirmation in low-confidence scenarios. This combined logic- and learning-based approach may support both precision and adaptability, enabling the metadata generation pipeline to evolve in response to new data patterns or operational policy updates.

In continued reference to FIG. 1, in embodiments where programmatically assigned descriptors are generated using probabilistic or machine learning-based models, system 100 may associate each descriptor with a corresponding confidence score or inference probability. This score may reflect system's 100 internal assessment of how likely the descriptor is to be correct based on the input features and the trained model's behavior. These confidence scores may be used in downstream validation routines to guide decision-making, escalate potential issues, or modulate the system's processing behavior. For example, in a dual-path processing context, if a descriptor is associated with a confidence score below a predefined threshold (e.g., 70%), the system may flag the associated record for review, route it through a manual override path, or delay further processing until confirmation is received from a human reviewer. In some embodiments, low-confidence descriptors may trigger the presentation of alternate candidates using the user interface 122, allowing users to select the most appropriate label from a ranked list. In other embodiments, descriptor confidence scores may influence how strict system 100 is when applying validation logic. For instance, a constraint profile 140 may include temporal delivery thresholds that differ based on descriptor certainty (e.g., a record tagged with "telehealth session" at 95% confidence may be subject to more stringent delivery timing rules than a session tagged at 60% confidence). This allows system 100 to dynamically scale its validation strictness based on the reliability of its underlying metadata inferences. Moreover, aggregated confidence scores across service records may inform quality assurance metrics, training dataset selection, or even model retraining pipelines. For example, system 100 may periodically analyze descriptor confidence distributions to identify concept drift, labeling inconsistencies, or underrepresented scenarios, thereby improving metadata accuracy and system robustness over time.

With continued reference to FIG. 1, in an embodiment, at least a processor 108 is configured to instantiate a dual-path processing routine. Wherein, instantiating a dual-path routine includes transmitting the structured metadata object 124 to a first processing module 130 configured to compute a resource allocation output 132 as a function of transformation logic defined in a precompiled configuration file 134 and a second processing module 136 configured to evaluate utilization performance by applying a set of domain-specific normalization rules 138 to the structured metadata object 124. For purposes of this disclosure, a "dual-path processing routine" refers to a coordinated system operation in which the same structured metadata object 124 is concurrently routed through two discrete analytical pathways each designed to produce a separate output based on distinct logic sets.

In further reference to FIG. 1, although the first and second processing modules are described as operating in parallel, it is appreciated that such processing may occur in a logically concurrent or temporally proximate manner rather than in literal simultaneity. In practical implementations, the at least a processor 108 may execute instructions 116 associated with the first and second processing modules in rapid succession, in interleaved threads, or across separate processing cores if available. The timeframe between the execution of the respective transformation logics may range from milliseconds to several seconds, depending on system load, record complexity, and configuration parameters. In some embodiments, the structured metadata object may be routed to both modules using a shared message bus or memory space, enabling each module to independently access and process the object as soon as resources are available. This architecture may ensure that even when execution is serialized at the hardware level, the overall system behavior preserves the functional benefits of parallelism, namely, that both financial and compliance outputs are derived from a common data object without requiring re-ingestion or re-normalization. In embodiments involving large batch processing, system 100 may queue structured metadata objects and execute dual-path transformations using a scheduled pipeline or multi-threaded orchestration layer, maintaining high-throughput performance while still ensuring synchronization between modules.

In further reference to FIG. 1, the first processing module 130 is a computing subsystem configured to produce a "resource allocation output," which is defined herein, as any structured result used to support internal financial operations. For example, internal financial operations may include payroll processing, billing preparation, or service accounting. In an embodiment, the resource allocation output 132 may be computed as a function of "transformation logic," which refers to a set of rules, mappings, formulas, or algorithmic operations applied to the structured metadata object 124 to determine cost attribution, compensation eligibility, or billing status. The transformation logic may be implemented within a "precompiled configuration file," which is a modular data structure or executable logic component preloaded into the system and containing organization-specific or domain-specific financial processing rules. This file may define how descriptors, such as "group session," "non-billable training," or "remote delivery," affect rate calculations, unit conversions, or compensation routing. Because the configuration file is precompiled, it may enable efficient runtime evaluation without requiring changes to the source code when business logic is updated.

With continued reference to FIG. 1, in parallel, the structured metadata object 124 is also transmitted to the second processing module 136, which is configured to evaluate utilization performance. For purposes of this disclosure, "utilization performance" refers to the degree to which actual service delivery adheres to predefined delivery expectations, contractual thresholds, or operational constraints. In an embodiment, this evaluation may be performed by applying a set of domain-specific normalization rules 138 to the structured metadata object 124. As used herein, "domain-specific normalization rules" refer to contextual logic that standardizes and validates service entries based on factors relevant to the service setting. This may include authorized frequency, minimum or maximum time blocks, delivery location, or provider type. For example, normalization rules may dictate that services tagged for Medicaid reimbursement be recorded in 15-minute units, while other service types 164 may require alignment to 7-minute billing increments. A session delivered by a paraprofessional may be validated differently than one delivered by a licensed therapist. These rules allow the second processing module 136 to identify delivery inconsistencies, flag potential noncompliance, or classify exceptions for administrative review. In some embodiments, the results of this evaluation may feed into a time-mapping module 144 that aggregates time-based service records 118 over reporting intervals 120, enabling retrospective analysis of service patterns or prospective forecasting of compliance risk. By simultaneously, or substantially simultaneously, producing both the resource allocation output 132 and the utilization performance evaluation 139 from a common structured metadata object 124, system 100 ensures that service entries are financially actionable while also maintaining alignment with contractually mandated delivery standards.

In further reference to FIG. 1, in an embodiment, the set of domain-specific normalization rules 138 applied by the second processing module 136 may be selected dynamically as a function of at least one programmatically assigned descriptor included in the structured metadata object 124. In an embodiment, the at least one programmatically assigned descriptor may act as a conditional key or classification token that triggers the selection of a specific normalization rule set from a rules repository or schema-defined lookup structure. For example, if the structured metadata object 124 contains a descriptor indicating "Medicaid-funded," the system may automatically apply a rule set that includes 15-minute billing increments, restrictions on service overlap, and provider credential validation checks tailored to Medicaid policy. Similarly, a descriptor such as "school-based session" may prompt application of education-specific normalization criteria, such as alignment with academic calendars or allowable group ratios. In some embodiments, these rules may be organized into modular rule blocks, each tagged for retrieval based on one or more descriptor types, including service modality, funding source, discipline, or geographic jurisdiction.

With continued reference to FIG. 1, the rule selection process may be executed through a mapping engine configured to parse the structured metadata object 124 and match each relevant descriptor to one or more rule profiles defined in a precompiled configuration file 134. In some implementations, this file may be implemented as a key-value store, a JSON rules graph, or a compiled decision tree structure, enabling fast selection and application of domain-appropriate constraints. By anchoring normalization logic to descriptors embedded within the structured metadata object 124, system 100 may ensure that the utilization performance evaluation 139 is contextually aligned to the operational and regulatory landscape in which the service was delivered. This design supports high-fidelity evaluation even in heterogeneous deployment environments and reduces the need for manual configuration or ruleset switching across contracts, clients, or programs.

Still referring to FIG. 1, in an embodiment, at least a processor 108 is configured to retrieve a constraint profile 140 including at least one temporal delivery threshold 142 associated with the resource allocation output 132 and the utilization performance evaluation 139. For purposes of this disclosure, a "constraint profile" refers to a structured data object or configuration layer that defines one or more delivery parameters, limitations, or compliance conditions applicable to a given service context. The constraint profile 140 may be stored in association with a particular contract, payer type, service category, organizational policy, or recipient-specific plan of care. In some embodiments, the constraint profile 140 may be retrieved dynamically based on one or more descriptors within the structured metadata object 124, such as funding source, service type 164, or recipient eligibility tier, and may be stored in a central configuration database or loaded at runtime into a validation engine.

In further reference to FIG. 1, in some embodiments, constraint profiles 140 may be predefined by administrators or generated automatically by system 100. In one embodiment, system 100 may generate the constraint profile 140 by extracting delivery requirements from a service document 174 using a large language model 172 (LLM) or comparable natural language processing (NLP) engine. As used herein, a "service document" is any unstructured or semi-structured text-based artifact that specifies how services are to be rendered. In an embodiment, service document 174 may include one or more delivery requirements 190. Examples include payer agreements, individualized education plans (IEPs), state compliance manuals, memoranda of understanding, or contractual exhibits. The LLM 172 may be configured to process the service document 174 by tokenizing and parsing its natural language contents to identify at least one delivery requirement, that is, a condition, rule, or threshold expressed in human-readable language describing how, when, or under what constraints a service should be delivered. Non-limiting examples of delivery requirements include statements such as "no more than 4 sessions per month," "minimum 30 minutes per week," or "authorization required after 10 hours of service."

In continued reference to FIG. 1, in some embodiments, the system 100 may input the service document 174 into the LLM 172 using a prompt pipeline or API-based integration. The LLM 172 may then output at least one delivery expectation 192, which may include a set of delivery expectations that are automatically mapped to corresponding structured metadata fields based on a predefined schema. For instance, "4 sessions per month" may be mapped to a field labeled monthly_max_sessions with a value of 4. The mapping step may be accomplished using deterministic rule application, schema-specific templates, or probabilistic alignment logic trained on prior contract examples. System 100 may then generate the constraint profile 140 by populating a predefined constraint profile schema 176 using the structured metadata derived from the mapped delivery expectations. In some embodiments, this schema may be defined using a relational model, a key-value store, a JSON ruleset, or other machine-readable data format. Fields may be tagged with version control information, source attribution (e.g., "IEP dated 2025 Feb. 10"), and rule classification identifiers (e.g., "Medicaid logic group").

With further reference to FIG. 1, in some embodiments, system 100 may further include or access a rule validation engine that performs conformance checks between the extracted delivery expectations and the constraint profile schema 176. This engine may verify that extracted constraints align with supported value types, units of time, frequency intervals, and service categories. If misalignment or ambiguity is detected, system 100 may flag the field for manual review or invoke a correction subroutine using system-defined defaults. This LLM-based extraction and mapping pipeline may enable system 100 to scale constraint management across multiple document types and service domains. In doing so, it minimizes manual entry, reduces administrative overhead, and improves delivery conformance by ensuring that all service validation routines operate against standardized, structured constraint data derived directly from authoritative source materials.

Still referring to FIG. 1, for purposes of this disclosure, a "large language model," as used herein, is a deep learning data structure that can recognize, summarize, translate, predict and/or generate text and other content based on knowledge gained from massive datasets. Large language models 172 may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications, advertising documents, newspaper articles, IEPs, and the like. In some embodiments, training sets of LLM 172 may include information from one or more public or private databases. As a non-limiting example, training sets may include databases associated with an entity. In some embodiments, training sets may include portions of documents associated with the electronic records correlated to examples of outputs. In an embodiment, LLM 172 may include one or more architectures based on capability requirements of LLM 172. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, LLM 172 may be generally trained. As used in this disclosure, a "generally trained" LLM is an LLM that is trained on a general training set comprising a variety of subject matters, data sets, and fields. In some embodiments, LLM 172 may be initially generally trained. Additionally, or alternatively, LLM 172 may be specifically trained. As used in this disclosure, a "specifically trained" LLM is an LLM that is trained on a specific training set, wherein the specific training set includes data including specific correlations for the LLM 172 to learn. As a non-limiting example, LLM 172 may be generally trained on a general training set, then specifically trained on a specific training set. In an embodiment, specific training of LLM 172 may be performed using a supervised machine learning process. In some embodiments, generally training LLM 172 may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as LLM 172 may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as LLM 172 may include fine-tuning the pretrained model using Low-Rank Adaptation (LoRA). As used in this disclosure, "Low-Rank Adaptation" is a training technique for large language models 172 that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments LLM 172 may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. LLM 172 may include a text prediction based algorithm configured to receive an article and apply a probability distribution to the words already typed in a sentence to work out the most likely word to come next in augmented articles. For example, given the sentence fragment from a contract: "Each student must receive no less than 120 minutes of direct therapy per month . . . ", the LLM 172 may assign a high probability to recognizing "120 minutes" as a minimum time threshold, "direct therapy" as a service category, and "per month" as the temporal interval. Based on token likelihood and context, the LLM 172 may label this phrase as a structured constraint and associate it with relevant fields in a constraint profile 140. The LLM 172 may output such inferences using ranking or scoring logic and may be further configured to prioritize or disambiguate extracted values using prompt parameters or rule filters. In some embodiments, the LLM 172 may include an encoder component for contextual representation of input tokens and a decoder component for generating structured outputs, classifications, or summaries aligned with system schemas.

Still referring to FIG. 1, LLM 172 may include a transformer architecture. In some embodiments, encoder component of LLM 172 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM 172 and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 172 may predict the next word by searching for a set of positions in a source sentence where the most relevant information is concentrated. LLM 172 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to LLM 172, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 172 may pick up particular parts at different positions in the input sequence and over time compute an initial composition of the output sequence. In multi-head attention, LLM 172 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 172 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM 172 may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 172 may either attend to all source words or predict the target sentence, thereby attending to a smaller subset of words.

With continued reference to FIG. 1, multi-headed attention in encoder may apply a specific attention mechanism called self-attention. Self-attention allows models such as LLM 172 or components thereof to associate each word in the input, to other words. As a non-limiting example, LLM 172 may learn to associate the word "you", with "how" and "are". It's also possible that LLM 172 learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it.

Stacking layers may allow LLM 172 to learn to extract and focus on different combinations of attention from its attention heads.

With continued reference to FIG. 1, LLM 172 may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with a contractual service agreement or policy document, such as a PDF copy of a Medicaid reimbursement contract, an individualized education plan (IEP), or a district-level service mandate. The LLM 172 may parse the content of the document to identify relevant delivery requirements, such as session frequency, provider qualifications, or authorized service types 164, and output structured data fields suitable for constraint profile 140 generation.

With continued reference to FIG. 1, LLM 172 may generate at least one annotation as an output. At least one annotation may be any annotation as described herein. In some embodiments, LLM 172 may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like. The outputs generated by the LLM 172, whether extracted constraints, structured annotations, or tagged compliance parameters, may be incorporated into one or more constraint profiles within system 100. Once generated or retrieved, these profiles may serve as active enforcement tools within the system's processing workflow.

In continued reference to FIG. 1, in an embodiment, each constraint profile 140 may include one or more "temporal delivery thresholds," which, as used herein, refer to defined limits or expectations related to the timing, frequency, duration, or scheduling of service delivery. A temporal delivery threshold may represent a minimum or maximum number of service minutes over a given time interval (e.g., per day, per week, per month), or it may define required spacing between sessions, blackout periods, or allowable ranges for session lengths. For example, a threshold may specify that a student must receive a minimum of 120 minutes of speech therapy per month, or that Medicaid-funded behavioral health services may not exceed 60 minutes per session unless prior authorization is obtained. Other examples include restricting session frequency to no more than three visits per week or enforcing a minimum interval of 48 hours between repeated sessions of the same type. In some embodiments, constraint profiles 140 may be multi-layered, with temporal delivery thresholds defined at both the individual and programmatic level. For instance, an individual's IEP (Individualized Education Plan) may impose specific weekly targets, while a district- or payer-level contract may define broader monthly caps or maximum annual units. By retrieving the applicable constraint profile 140 and aligning it with both the resource allocation output 132 and the utilization performance evaluation 139, system 100 may ensure that each service record is not only appropriately processed for financial actionability but also evaluated for compliance with delivery obligations. This allows the system to support real-time alerts 162, exception tracking, and performance reporting at both the individual and organizational levels.

In further reference to FIG. 1, in an embodiment, at least a processor 108 is configured to aggregate time-based service records 118 over a reporting interval 120 as a function of the structured metadata. For purposes of this disclosure, a "reporting interval" is a bounded span of time over which service data is collected, grouped, and analyzed. In various embodiments, a reporting interval 120 may be defined by system 100 or a user, and may include, as non-limiting examples, a calendar week, a service month, a fiscal quarter, an academic term, or a custom time span defined by contract or organizational policy. In some implementations, at least a processor 108 may determine the reporting interval 120 dynamically by referencing at least a structured metadata field 180 embedded in the structured metadata object 124, such as service date, session duration, or provider shift block, and binning time-based service records 118 accordingly. This aggregation process may involve indexing service records to a temporal key associated with the reporting interval 120 and applying one or more filtering rules to ensure records fall within scope (e.g., excluding future-dated entries, records lacking sufficient metadata, or provisional entries marked as drafts). In an embodiment, at least a processor 108 may store and organize aggregated records within a normalized data structure, such as a multi-level time map or indexed data frame, thereby enabling downstream modules (e.g., time-mapping module 144, analytics engines) to operate on the full temporal dataset in a consistent and computationally efficient format. In some embodiments, at least a processor 108 may also tag the aggregated data with metadata such as interval type (e.g., "monthly Medicaid window"), completeness status (e.g., "partially populated"), or exception indicators (e.g., "overlap detected") to support system-wide data integrity and reporting fidelity.

With further reference to FIG. 1, in an embodiment, the aggregation of time-based service records 118 may additionally involve generating interval-specific data structures configured to retain both a temporal bin key and cross-stratified indexing. For example, system 100 may maintain an in-memory service frame comprising rows of timestamp-aligned records and columns associated with key descriptors (e.g., service type 164, funding source, provider role). Each service record may be assigned to an interval bin and aligned to the appropriate sub-indexes based on its structured metadata object 124. This enables multi-dimensional aggregation and permits slice-and-filter queries that target a specific funding source across a specified interval. In some cases, the aggregation step may also include real-time or streaming accumulation. In a streaming implementation, system 100 may incrementally assign new service records to the current reporting interval buffer, perform periodic normalization, and update aggregate statistics such as total minutes delivered, average session length, or modality distribution. The streaming buffer may also enable immediate integrity checks and early detection of threshold violations.

In continued reference to FIG. 1, in an embodiment, the time-mapping module 144 may interface with the aggregation layer to resolve ambiguities in temporal metadata. For example, if a service record lacks an explicit start time but includes a shift reference, the time-mapping module 144 may impute a time range based on organizational scheduling templates. In another case, overlapping records may be flagged and disambiguated using contextual cues such as record provenance or session notes. Additionally, the user interface 122 may surface visual representations of the aggregated reporting intervals 120, allowing users to interact with specific bins (e.g., month view) and review summary statistics or drill into anomalies. These views may be filtered by descriptor fields (e.g., "display only Medicaid-funded speech sessions") and annotated with exception markers, thereby improving auditability and enabling actionable insights across organizational roles.

In continued reference to FIG. 1, in an embodiment, at least a processor 108 is configured to generate a temporal distribution profile 154 using a time-mapping module 144. For purposes of this disclosure, a "temporal distribution profile" a structured data representation that maps the timing, frequency, and distribution of service-related activities across a defined reporting interval 120. The temporal distribution profile 154 may serve as a derived output object 148 downstream of the structured metadata object 124 and may reflect service alignment with the applicable constraint profile 140, including one or more temporal delivery thresholds. In some embodiments, the temporal distribution profile 154 may be implemented as a multi-dimensional data structure, such as an indexed matrix, hierarchical key-value map, or time-segmented JSON object. Each entry or cell in the profile may correspond to a discrete time unit (e.g., hourly, daily, weekly), and may store a count or cumulative duration of mapped service records aligned to that time unit. Each mapped time-based service record 118 may be associated with one or more structured metadata fields, such as session type, funding category, delivery mode, or provider classification. These structured metadata fields may be used to stratify the temporal distribution profile 154 by additional dimensions (e.g., by service type 164 over time), enabling nuanced analysis of utilization. For example, a temporal distribution profile 154 spanning a monthly reporting interval 120 may include thirty-one daily entries, each entry containing one or more subfields representing aggregated service minutes, record count, or normalized delivery ratios stratified by descriptor fields (e.g., "speech therapy," "Medicaid-funded," "in-home"). In some implementations, the data structure may include fields for calculated metrics such as a constraint deviation metric 146, coverage density, delivery trendline, or compliance score, which may be computed in real-time or batch mode. In embodiments involving streaming accumulation, the profile may be progressively updated as new time-based service records 118 are received and processed by system 100.

With further reference to FIG. 1, in an embodiment, the temporal distribution profile 154 may be linked to a specific reporting interval 120 using metadata tags and may include summary statistics such as total minutes delivered, threshold delta, maximum service density, or flags indicating service gaps or overages. It may be stored in a normalized data structure within system memory or a persistent data store and made accessible to other system components such as visualization layers 152, utilization analysis routines, or alert generation modules. Additionally, in some embodiments, the temporal distribution profile 154 may serve as a source for populating an interactive user interface 122, where it may be rendered using graphical elements such as histograms, line plots, or heatmaps, allowing users to explore service distribution in relation to temporal targets and deviation patterns.

In continued reference to FIG. 1, in an embodiment, the time-mapping module 144 may be configured to segment the reporting interval 120 into time units 182. As used herein, a "time unit" is a discrete subdivision of the reporting interval 120 used to temporally organize service events. Non-limiting examples of time units 182 may include minutes, hours, days, weeks, or custom blocks such as instructional periods or clinic shifts. The size and format of each time unit may be dynamically determined by system configuration, metadata field analysis, or contract constraints. In some embodiments, time units 182 may be fixed for a given reporting interval 120 (e.g., daily blocks over a service month), while in others, they may vary by user group, funding source, or delivery modality.

With continued reference to FIG. 1, in an embodiment, the time-mapping module 144 may be configured to align each time-based service record 118 of the plurality of time-based service records 143 to the time units 182 as a function of at least a structured metadata field 180. For purposes of this disclosure, a "structured metadata field" is a standardized data attribute extracted or derived from a service record. For example, such as a session start time, end time, duration, provider shift identifier, or schedule block. The time-mapping module 144 may use one or more of these fields to determine the correct placement of each service record within the segmented time units 182 of the reporting interval 120. For example, a record with a structured metadata field indicating a timestamp of "Mar. 10, 2025, 2:00 PM" may be assigned to the appropriate hourly or daily bin for that interval.

In further reference to FIG. 1, in an embodiment, the time-mapping module 144 may be configured to compute a constraint deviation metric 146 as a function of comparing the plurality of time-based service records 143 to the at least one temporal delivery threshold 142. A "constraint deviation metric," as used herein, refers to a quantitative value indicating the extent to which actual service delivery conforms to, exceeds, or falls short of expected delivery parameters defined in a constraint profile 140. For example, if a delivery threshold requires a minimum of 120 minutes of service per month and only 90 minutes are mapped to the interval, the constraint deviation metric 146 may be expressed as a shortfall of 30 minutes or as a normalized percentage deviation. The metric may account for overages, gaps, compliance margins, or exception flags and may be used to trigger alerts 162, generate reports, or inform scheduling recommendations.

With further reference to FIG. 1, in some embodiments, the time-mapping module 144 may maintain a cumulative record of constraint deviation metrics 146 over multiple reporting intervals 120, enabling longitudinal analysis of utilization trends, provider performance, or service pattern drift. These cumulative records may be organized in a rolling window structure or fixed-interval dataset, facilitating the application of trendline detection algorithms, change-point analysis, or compliance scoring models. For instance, a persistent underdelivery pattern across three consecutive months for a particular provider type may trigger a policy review or system-generated alert 162. In an embodiment, the time-mapping module 144 may also be configured to handle edge cases, such as partially recorded sessions, overlapping entries, ambiguous timestamps, or inferred timing. In such cases, the time-mapping module 144 may apply correction factors derived from system heuristics, normalization rules, or historical pattern models. For example, if two overlapping sessions are submitted under the same provider ID and service code, system 100 may apply conflict resolution logic based on session start time confidence, provider workload caps, or historical service overlap frequencies. Similarly, if a session lacks a definitive timestamp but is associated with a known shift block or logged event, the module may infer a delivery window and assign it to the appropriate time unit with a confidence weighting.

In continued reference to FIG. 1, in an embodiment, the time-mapping module 144 is further configured to receive an additional time-based service record 118 and update the aggregation of time-based service records 143 over the reporting interval 120 as a function of the structured metadata object 124 associated with the additional time-based service record 118. For example, upon receipt of a newly submitted service record, the time-mapping module 144 may parse the structured metadata object 124 to extract key attributes such as timestamp, session type, and provider classification. The module may then determine the appropriate time unit within the active reporting interval 120 and incorporate the new record into the existing aggregation logic, updating counts, durations, or associated deviation metrics accordingly. In some embodiments, this update may occur in near-real-time, enabling streaming accumulation of time-based data. In other embodiments, the update may be deferred for batch processing or initiated upon detection of reporting events, such as interval closure or threshold violations. To maintain data integrity, the time-mapping module 144 may also apply validation rules or conflict resolution logic, such as timestamp reconciliation, duplication checks, or prioritization of records based on confidence scores or submission provenance, before updating the aggregated dataset.

In continued reference to FIG. 1, in an embodiment, the temporal distribution profile 154 may be stored in a normalized data structure, such as a multi-dimensional array, indexed time map, or time-series database entry, enabling efficient retrieval, update, and analysis. The profile may be queried or rendered by downstream modules, such as constraint analysis routines, visualization engines, or audit reconciliation workflows. In some implementations, the profile may also serve as an input to a machine learning model trained to predict service gaps, recommend provider reassignments, or auto-populate missing records based on temporal and descriptor-level correlation patterns.

With further reference to FIG. 1, in an embodiment, at least a processor 108 is configured to generate an output object 148 as a function of the temporal distribution profile 154. For purposes of this disclosure, an "output object" is a structured, machine-readable data artifact that encodes summary metrics, compliance indicators, or action directives derived from one or more computed constraint deviation metrics 146 within a defined reporting interval 120. In an embodiment, the output object 148 may include a plurality of fields populated using data extracted or computed from the temporal distribution profile 154. Such fields may include, as non-limiting examples: total service minutes delivered within the reporting interval 120, number of service sessions, descriptor-stratified compliance percentages, cumulative deviation values (e.g., total minutes underdelivered), and threshold-matching identifiers. The output object 148 may also contain status flags (e.g., "compliant," "at-risk," "non-compliant") or confidence scores indicating the reliability of the temporal alignment or metadata integrity.

In further reference to FIG. 1, in some embodiments, the output object 148 may be directed to one or more downstream system layers for action or display. For example, this may include one or more visualization layers 152, alert generation layers, and/or the like. In an embodiment, system 100 may surface the output object 148 using a GUI configured to render a temporal service distribution visualization, as further described in relation to GUI related disclosure above. The visualization layer 152 may include bar graphs, heatmaps, or calendar overlays representing service distribution across time units 182 within the reporting interval 120. In response to user interaction (e.g., selecting a time bin or descriptor category), system 100 may expose detailed service delivery records, highlight deviations from expected thresholds, or enable comparative views across providers or time periods. The visualization layer 152 may support interactive filtering, zooming, or annotation features to facilitate audit review, supervision, or administrative planning.

With continued reference to FIG. 1, in some implementations, the output object 148 may be analyzed by an alert logic module configured to detect threshold violations, anomalous patterns, or sustained underperformance. Upon satisfying one or more alert criteria, the alert logic module may generate a structured alert object comprising: (i) the nature of the deviation (e.g., "weekly minimum unmet"), (ii) relevant service details (e.g., student ID, provider role, session type), (iii) the reporting interval 120 context, and (iv) a suggested remediation or follow-up action (e.g., "schedule catch-up session," "trigger administrative review"). These alerts 162 may be queued for display in the user interface 122, transmitted as push notifications, or logged in a compliance audit trail.

In continued reference to FIG. 1, in an embodiment, the alert logic module may employ a variety of computational techniques, ranging from rule-based heuristics to adaptive machine learning models, depending on implementation needs. In a basic configuration, the alert logic may include deterministic rule sets, such as "if total minutes <required threshold, then generate alert 162," or "if three or more missed sessions are detected in a rolling 30-day window, then flag provider." These rules may be defined by organizational policy, regulatory requirements, or administrative user input, and may be structured in a format compatible with logic programming or business rules engines (e.g., Drools, Prolog).

With continued reference to FIG. 1, in some embodiments, system 100 may further include a utilization support module 184 communicatively connected to the at least a processor 108. For purposes of this disclosure, a "utilization support module" is a system-integrated or external scheduling engine, calendar subsystem, or provider availability index that enables downstream coordination of service delivery in response to detected constraint deviations. The utilization support module 184 may interface with internal resource allocation data, third-party scheduling APIs, or staff assignment records, and may operate in real time or batch modes. In one embodiment, in response to generating a constraint deviation metric 146 based on the temporal distribution profile 154, at least a processor 108 may be configured to identify a service type 164 and a corresponding time requirement 186 that was not satisfied within the reporting interval 120 (e.g., "speech therapy: 60 minutes short in March"). At least a processor 108 may then transmit a query 178 to the utilization support module 184, wherein the query 178 includes a structured data request formatted in accordance with a predefined schema (e.g., JSON, XML, or SQL-based) and includes parameters representative of the time requirement 186 (e.g., 60 minutes of speech therapy before March 31) and at least a provider assignment constraint 187, such as provider role, credentialing status, location eligibility, or existing workload.

In further reference to FIG. 1, in some embodiments, the query 178 generation process may leverage domain-specific normalization rules 138 applied earlier in the dual-path processing routine. For example, if the normalized session units for Medicaid-funded services are defined as 15-minute blocks, system 100 may round the time requirement 186 to a multiple of 15 before constructing the query 178 (e.g., four 15-minute units). Additional normalization rules may influence provider eligibility, such as excluding paraprofessionals from being assigned to specific service types 164. Upon receiving a response from the utilization support module 184, at least a processor 108 may be further configured to generate an alert 162 comprising a configurable event entry 188. As used herein, a "configurable event entry" is a proposed service event object. In some cases, the configurable event entry 188 may include fields such as suggested date/time, session duration, eligible providers, delivery location, and required service type 164. The entry may be generated in draft status and presented to a user using the GUI for confirmation, modification, or immediate scheduling. For example, the alert 162 may surface in the GUI as: "60 minutes of speech therapy underdelivered for Student A. Suggested catch-up session: March 28, 10:00-11:00 AM with Provider X. Click to confirm." The GUI may further incorporate visualization elements previously described, such as an interactive calendar overlay or service distribution histogram, allowing the user to visually inspect existing service coverage, evaluate proposed remediations in temporal context, and interactively modify the event entry. For example, a user may click a time bin from the calendar to view open slots or use descriptor-based filters (e.g., "show only Medicaid-eligible providers") to refine the options.

In some implementations, configurable event entries may be transmitted to downstream scheduling engines, logged for compliance review, or stored with metadata flags indicating their relationship to a specific constraint deviation (e.g., linked alert ID, deviation type, severity). By integrating constraint-based service coordination into the alert generation pipeline and surfacing remediation options through the GUI, system 100 may provide a closed-loop framework for adaptive compliance management, enabling administrators to respond proactively to underdelivery patterns in a technically traceable and operationally efficient manner.

Still referring to FIG. 1, in more advanced configurations, the alert logic module may incorporate pattern recognition techniques to identify complex service delivery anomalies. For example, system 100 may apply unsupervised learning algorithms, such as clustering or principal component analysis (PCA), to historical temporal distribution profiles 154 to establish baseline norms for service delivery. Deviations from these norms, such as unexpected service gaps, unusual provider rotations, or out-of-distribution session timing, may be flagged for human review. In some embodiments, the alert logic module may include or communicate with a supervised machine learning classifier trained on labeled compliance outcomes (e.g., past alerts, audit findings, administrative interventions). Features fed into the model may include aggregated temporal features (e.g., average session interval, session density per time unit), structured metadata fields (e.g., funding source, provider role, service type 164), and prior deviation metrics. The alert logic model may output an alert likelihood score or severity ranking, which system 100 can use to prioritize or suppress alerts 162 based on expected materiality or operational impact.

In further reference to FIG. 1, to ensure transparency and regulatory defensibility, system 100 may log the input features, model parameters, and decision thresholds used in the generation of each alert 162. In some implementations, alerts 162 may also include confidence scores or explanation fields identifying the factors contributing to the system's decision, such as "high deviation in weekday delivery pattern," or "historical underdelivery in previous quarter." Additionally, the alert logic module may be configured to adapt over time. For example, alert 162 thresholds may be dynamically tuned based on feedback (e.g., manual alert dismissals or administrative overrides), allowing the system to reduce false positives while preserving sensitivity to critical delivery failures. This adaptation may be implemented using online learning, reinforcement learning, or other feedback-loop based mechanisms. By incorporating both static and adaptive logic components, the alert logic module may enhance the system's ability to detect nuanced or domain-specific service anomalies while maintaining traceable, auditable control over alert generation behavior.

With further reference to FIG. 1, in continued discussion of the output object 148, in an embodiment, the output object 148 may also include metadata identifying its provenance, processing timestamp, and associated schema version to ensure traceability and cross-module interoperability. System 100 may maintain a history of output objects 148, enabling longitudinal tracking of constraint performance and feeding models for predictive analytics (e.g., forecasting future service gaps). In some embodiments, the output object 148 may serve as an input to external systems, such as electronic health records (EHRs), billing engines, or compliance dashboards. In some cases, system 100 may format the output object 148 in accordance with a target integration specification (e.g., HL7, FHIR, custom XML or JSON schemas) to facilitate interoperability. By generating and operationalizing the output object 148 as a function of the temporal distribution profile 154, system 100 may enable a technically grounded, automation-friendly pathway for converting raw service data into compliance-relevant, actionable intelligence. This architecture supports real-time responsiveness, auditability, and scalable reporting across high-volume or policy-constrained service domains.

Figure 2A:
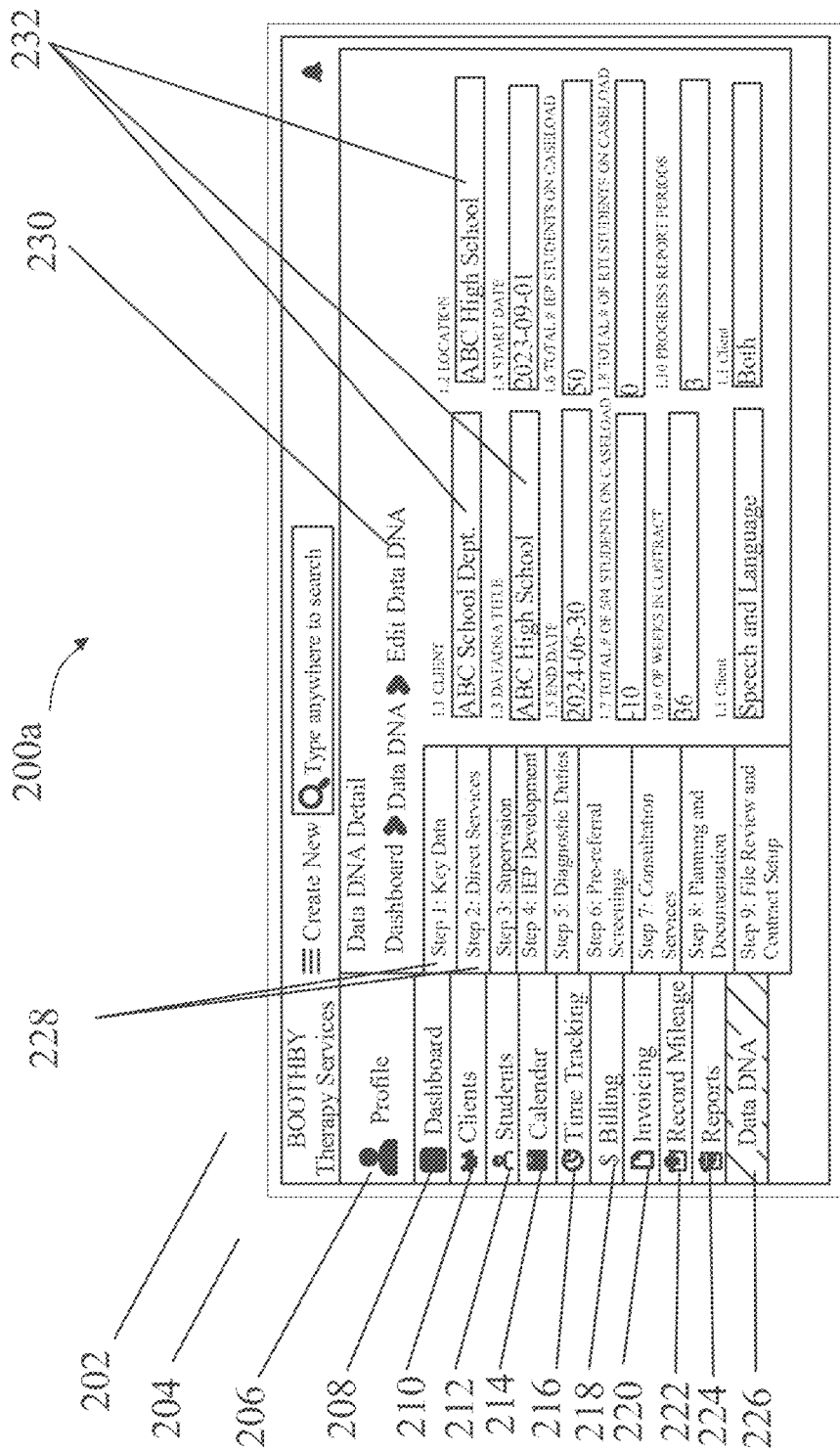
FIG. 2A is an exemplary illustration of a graphical user interface.

Referring now to FIG. 2A, an exemplary illustration 200a of a graphical user interface. In an embodiment, the illustration 200a may include a graphical user interface 202. In an embodiment, the graphical user interface 202 may be displayed on a downstream device 204. In an embodiment, the downstream device 204 may include a computing device configured to receive and display real-time outputs generated by an assignment model. For example, without limitation, the downstream device 204 may include a desktop computer, a tablet, a smartphone, a smartboard, or a web-enabled kiosk. In an embodiment, the graphical user interface 202 may include a user profile 206. In an embodiment, the user profile 206 may include interface elements for displaying information associated with a specific user role. For example, without limitation, the user profile 206 may include identification data, access privileges, resource preferences, role-based settings, and a history of prior assignments and outputs. In an embodiment, the graphical user interface 202 may include a dashboard 208. In an embodiment, the dashboard 208 may include dynamically updated visual elements summarizing the output object. For example, without limitation, the dashboard 208 may include charts, progress indicators, alerts, notifications, data tables, and interactive filters for reviewing and managing matched data and operations across multiple nodes. In an embodiment, the graphical user interface 202 may include a client tab 210. In an embodiment, the client tab 210 may include interface elements configured to display and manage information related to one or more organizational clients. For example, without limitation, the client tab 210 may include client identifiers, contact information, service agreements, assigned resources, and performance metrics associated with each client. In an embodiment, the graphical user interface 202 may include a student tab 212. In an embodiment, the student tab 212 may include data fields and navigation tools configured to present student-specific information. For example, without limitation, the student tab 212 may include individualized education plans (IEPs), progress tracking indicators, matched resource assignments, service histories, and associated goals and criteria. In an embodiment, the graphical user interface 202 may include a calendar tab 214. In an embodiment, the calendar tab 214 may include scheduling tools for visualizing and managing sessions, assignments, and service events across multiple time intervals. For example, without limitation, the calendar tab 214 may include a drag-and-drop interface, color-coded task blocks, recurring appointment settings, and filters for resource type, student, or client. In an embodiment, the graphical user interface 202 may include a time tracking tab 216. In an embodiment, the time tracking tab 216 may include functionality for logging and reviewing time spent on resource assignments or service tasks. For example, without limitation, the time tracking tab 216 may include time entry fields, start/stop timers, automated timesheet generation, and summary reports segmented by resource, client, or student. In an embodiment, the graphical user interface 202 may include a billing tab 218. In an embodiment, the billing tab 218 may include features for configuring and reviewing billing details associated with resource assignments and services rendered. For example, without limitation, the billing tab 218 may include itemized billing breakdowns, billing codes, payer information, service dates, and cost allocation summaries. In an embodiment, the graphical user interface 202 may include an invoicing tab 220. In an embodiment, the invoicing tab 220 may include tools for generating, sending, and tracking invoices associated with client or district accounts. For example, without limitation, the invoicing tab 220 may include pre-populated invoice templates, submission status indicators, batch processing tools, and integration with external accounting systems. In an embodiment, the graphical user interface 202 may include a record mileage tab 222. In an embodiment, the record mileage tab 222 may include functionality for logging transportation activity related to service delivery. For example, without limitation, the record mileage tab 222 may include mileage input fields, automated route tracking, reimbursement rate settings, and time-stamped logs associated with service sessions. In an embodiment, the graphical user interface 202 may include a reports tab 224. In an embodiment, the reports tab 224 may include tools for generating customized reports based on service, resource, or student data. For example, without limitation, the reports tab 224 may include filters for date range, user role, or service type, export options in multiple formats, and visualizations such as charts, graphs, and tables to support decision-making. In an embodiment, the graphical user interface 202 may include a DataDNA tab 226. In an embodiment, the DataDNA tab 226 may include features for visualizing and analyzing underlying datasets used to drive assignment models and performance metrics. For example, without limitation, the DataDNA tab 226 may include interactive data maps, node and entity relationships, attribute breakdowns, comparison tools, audit trails, and statistical summaries that enable users to explore how data influences matching outcomes and system recommendations. In an embodiment, the graphical user interface 202 may include one or more steps 228. In an embodiment, the one or more steps 228 may be displayed when the DataDNA tab 226 is clicked on. In an embodiment, the one or more steps 228 may include the flowing, "Step 1: Key Data," "Step 2: Direct Services," "Step 3: Supervision," "Step 4: IEP Development," "Step 5: Diagnostic Duties," "Step 6: Pre-referral Screenings," "Step 7: Consultation Services," "Step 8: Planning and Documentation," "Step 9: File Review and Contract Setup," and the like. In an embodiment, the graphical user interface 202 may include a navigation tree 230. In an embodiment, the navigation tree 230 may include a visual tracking interface that displays a user's current location within the interface hierarchy. For example, without limitation, the navigation tree 230 may include breadcrumb paths, expandable menus, and highlighted sections to indicate which step, tab, or module the user is currently viewing, thereby supporting orientation and seamless navigation across related components. In an embodiment, the one or more steps 228 may include a plurality of input fields 232. In an embodiment, the plurality of input fields 232 may include data entry fields where the at least a processor populates the data field with the plurality of data as described in FIG. 1 which may include client data, such as the data from an entity profile, student data, such as the plurality of node data, provider data, such as the data for the plurality of resource profiles, and the like. In an embodiment, the at least a processor may retrieve the data for the input fields from the one or more databases as described in FIG. 1. In an embodiment, a user may manually input the data in the input data fields 232. In an embodiment, a user may override data that is auto populated by the at least a processor in the input data fields 232. In an embodiment, the input data fields 232 may include editable interface elements configured to receive user-provided entries for purposes of refining, correcting, or supplementing assignment model inputs. For example, without limitation, the input data fields 232 may include dropdown menus, text boxes, checkboxes, date selectors, and numerical entry fields for entering service minutes, eligibility status, caseload adjustments, or role-specific parameters.

Figure 2B:
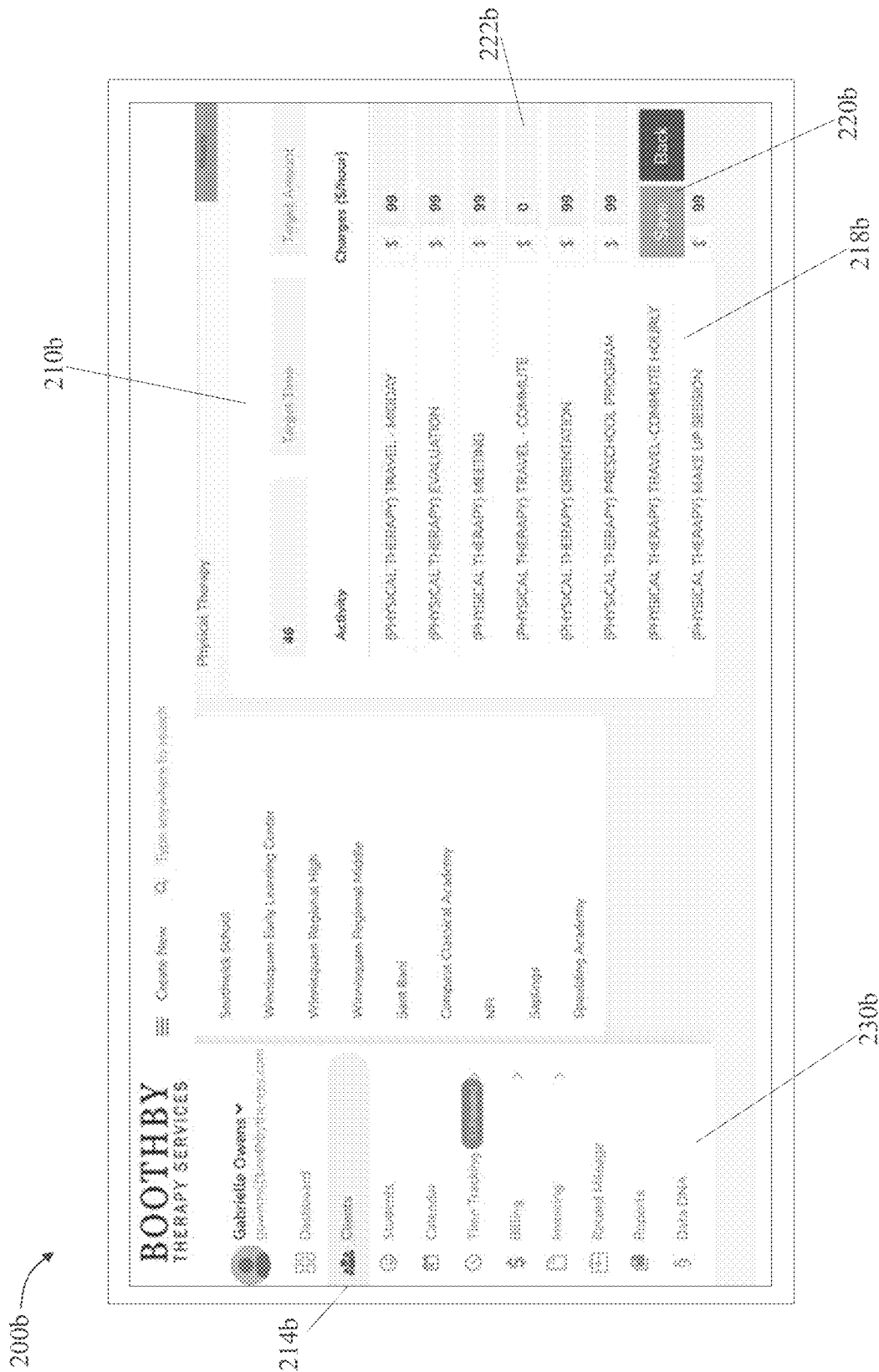
FIG. 2B illustrates an exemplary graphical user interface (GUI)

Now referring to FIG. 2B, illustrates an exemplary graphical user interface (GUI) 200*b* rendered by system 100 in an embodiment configured for resource allocation processing. As shown, the GUI 200*b* includes multiple display regions, each reflecting a downstream effect of structured metadata object propagation through the first processing module. In this configuration, the first processing module is responsible for computing a resource allocation output as a function of transformation logic defined in a precompiled configuration file. This file may contain mapping rules, billing formulas, service type parameters, and funding source schemas, enabling the system to derive actionable billing data from the received time-based service record. GUI 200*b* presents this output as structured financial indicators, such as reimbursable units, billing modifiers, or plan-aligned line items.

With further reference to FIG. 2B, in an embodiment, each region of the GUI 200*b* may correspond to a distinct metadata stratum or processing output. For example, field 210*b* surfaces information aligned with structured metadata fields (e.g., service code, session duration, funding source), and field 214*b* when interacted with may surface a view that depicts clients associated with a user, while sections 218*b* and 222*b* may represent derived metrics such as total reimbursable value, adjusted duration, or eligibility flags based on payer constraints. Further, region 220b may include a save button or back button allowing a user to save work and/or return to another screen. These graphical elements reflect data that has been transformed by the first processing module and are continuously synchronized with system-wide updates due to the parallel architecture of system 100. In this embodiment, the first and second processing modules operate in parallel, each receiving the structured metadata object generated from the time-based service record. This architecture may ensure that metadata enrichment, whether generated by descriptor selection, time-mapping, or constraint validation, is made available to both processing pathways. As such, updates to descriptors or derived metrics in one module (e.g., a corrected provider classification) are immediately accessible to the other module, preserving consistency across billing and utilization pipelines.

In further reference to FIG. 2B, in an embodiment, the GUI 200b may also integrate feedback from the second processing module, which evaluates utilization performance by applying domain-specific normalization rules to the structured metadata. In some implementations, exception indicators or compliance warnings, such as those shown in region 230b, may be surfaced if delivery thresholds are exceeded or if session parameters fail to align with authorized configurations. For example, a service delivered outside approved time windows or by an uncredentialed provider may be visually flagged for administrative review.

Still referring to FIG. 2B, an important component of the second processing module's output, as reflected in FIG. 2B, is the Data-Driven Needs Analysis (Data DNA) panel, illustrated at 230b. The Data DNA module operates as a workload analysis engine that interfaces with both the second processing module and the time-mapping module. It analyzes cumulative service records for a given provider, department, or organizational unit over a defined reporting interval, generating a comprehensive breakdown of workload distribution. This includes an itemization of time required for each component of the provider's job (e.g., direct therapy, documentation, travel, supervision), and a summary of the total job time required under current caseload and policy configurations. The itemized outputs are derived from structured metadata fields and contextual rules (e.g., service modality, frequency caps), and may be surfaced in GUI region 230b as time-allocation bars, sortable tables, or compliance deltas. In some embodiments, the Data DNA module may also feed into the constraint deviation metric pipeline, enabling predictive alerts if projected service obligations exceed available staffing or contractually permitted hours. This supports prospective planning, resource reallocation, or administrative escalation, and contributes to the generation of the output object. The output object, as generated downstream, may incorporate both financial line items (from the first processing module) and compliance or workload summaries (from the second processing module), enabling a unified audit and billing view.

Collectively, FIG. 2B illustrates an integrated, modular GUI environment that renders downstream artifacts of structured data processing performed by system 100. In this embodiment, time-based service records are transformed into structured metadata objects and concurrently propagated through multiple processing modules. The first processing module applies a rule-based transformation pipeline governed by a precompiled configuration file to generate resource allocation outputs, while the second processing module evaluates the same metadata object against domain-specific normalization logic to compute constraint deviation metrics and workload distribution models. These computational outputs are rendered within GUI 200b using dynamically updated visual elements and metadata-bound indicators. By maintaining state synchronization across both modules and surfacing their outputs in a unified interface, system 100 supports technical operations such as metadata validation, anomaly detection, structured time-segmentation, and model-informed inference of service requirements, all of which enhance data integrity, processing fidelity, and longitudinal traceability across service domains.

Figure 2C:
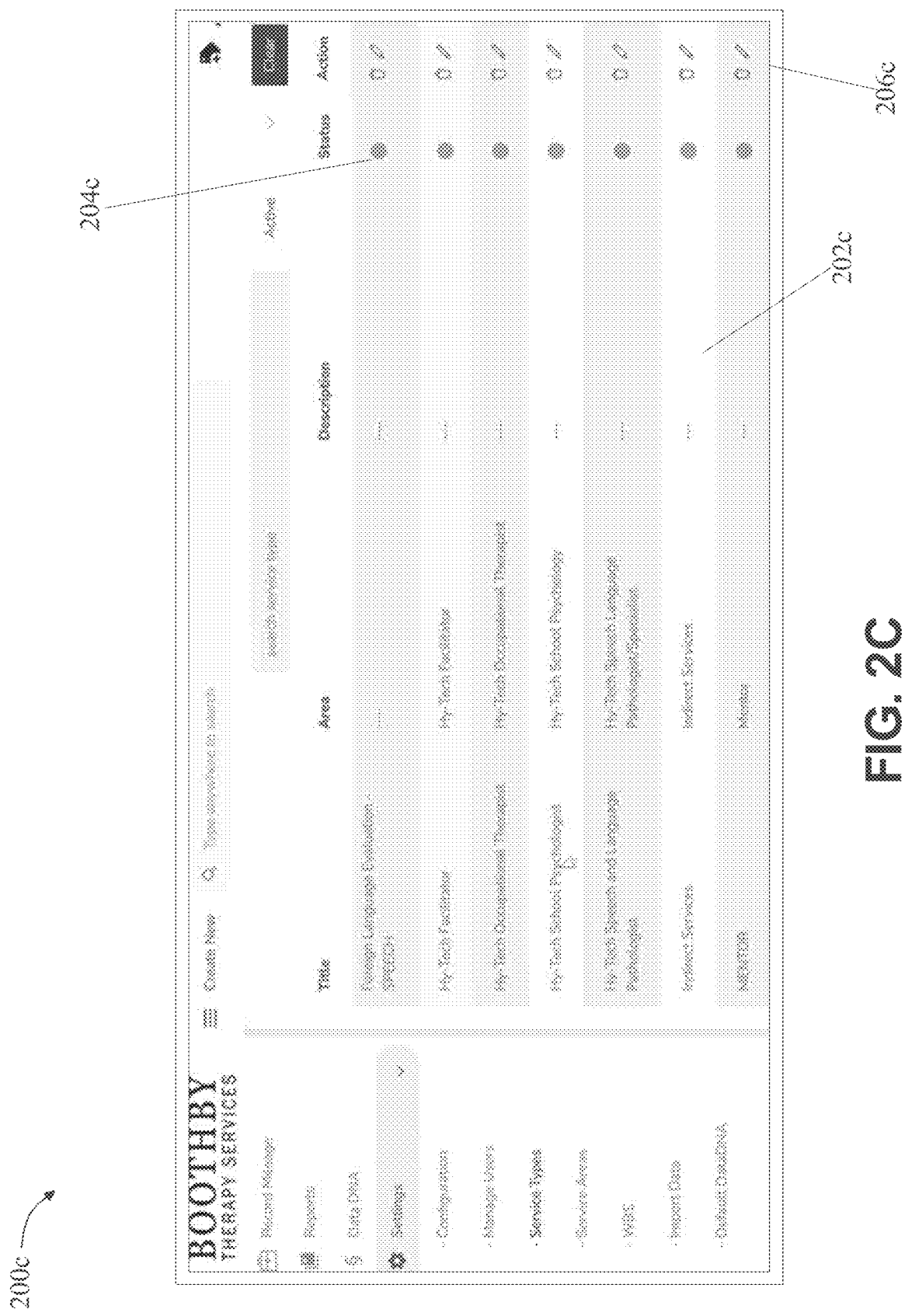
FIG. 2C illustrates an exemplary user interface.

Now referring to FIG. 2C, illustrated is an exemplary user interface 200c implemented by system 100 for managing service type definitions within a system-level configuration layer. In the embodiment shown, the user interface 200c corresponds to a settings management environment where administrators or authorized users can define, update, or deactivate service types that form part of the system's configurable schema. These service types may serve as descriptor categories that are used to populate structured metadata objects, which in turn control routing logic and rule selection within both the first and second processing modules, as discussed in relation to FIG. 1.

The interface 200c of FIG. 2C includes multiple fields 202c per entry, such as a Title field (e.g., "Hy-Tech Occupational Therapist"), an Area field (e.g., "Hy-Tech Psychology"), and a Description field. Each of these may correspond to one or more structured metadata fields embedded in the metadata object created at the time of receiving a time-based service record. The metadata fields 202c shown in this interface 200c may be programmatically referenced during downstream processing, for example, to trigger selection of a transformation rule in the first processing module or to invoke normalization logic in the second processing module based on provider discipline or service modality.

In continued reference to FIG. 2C, in an embodiment, the service type entries may be stored in a schema-linked data repository that defines the set of permissible or recognized descriptors. When a user submits a service record at runtime, a descriptor (such as "Hy-Tech Speech and Language Pathologist") may be automatically selected or inferred and validated against the entries defined in this configuration layer. The system may also use these entries to dynamically populate dropdown menus, suggestion fields, or autocomplete options within the graphical user interface (GUI), thereby promoting consistency across input records and reducing descriptor-level variance. The Status indicator 204c (e.g., green active dot) and the Action icons 206c (e.g., edit or delete) shown in the interface may provide an administrative control layer. These functions allow the user to activate or deactivate specific service types, ensuring that deprecated or misconfigured descriptor entries do not propagate through the dual-path processing routine. In some embodiments, changes to the configuration may trigger a versioning mechanism or flag any historical service records associated with deprecated descriptors for reprocessing or administrative review.

With further reference to FIG. 2C, in an embodiment user interface 200c may also support structured data export and import operations, enabling organizations to standardize descriptor schemas across deployments. In some embodiments, these service types may be semantically linked to downstream analytics engines (e.g., Data DNA) or constraint validation routines (e.g., mapping "School Psychologist" to a set of permissible session formats or ratio constraints). This linkage allows the configurable schema to act not only as a syntactic control layer but also as a semantic map for interpreting the functional scope of each submitted time-based service record. Through this architecture, user interface 200c exemplifies how the system supports structured, centralized management of descriptor fields used across distributed input pipelines and processing modules. By integrating user-configurable service types directly into the metadata generation and processing workflow, the system ensures alignment between user-entered data, metadata object structure, and rule-based module behavior, thereby enhancing processing integrity and reducing the risk of invalid or non-compliant record propagation.

Figure 3:
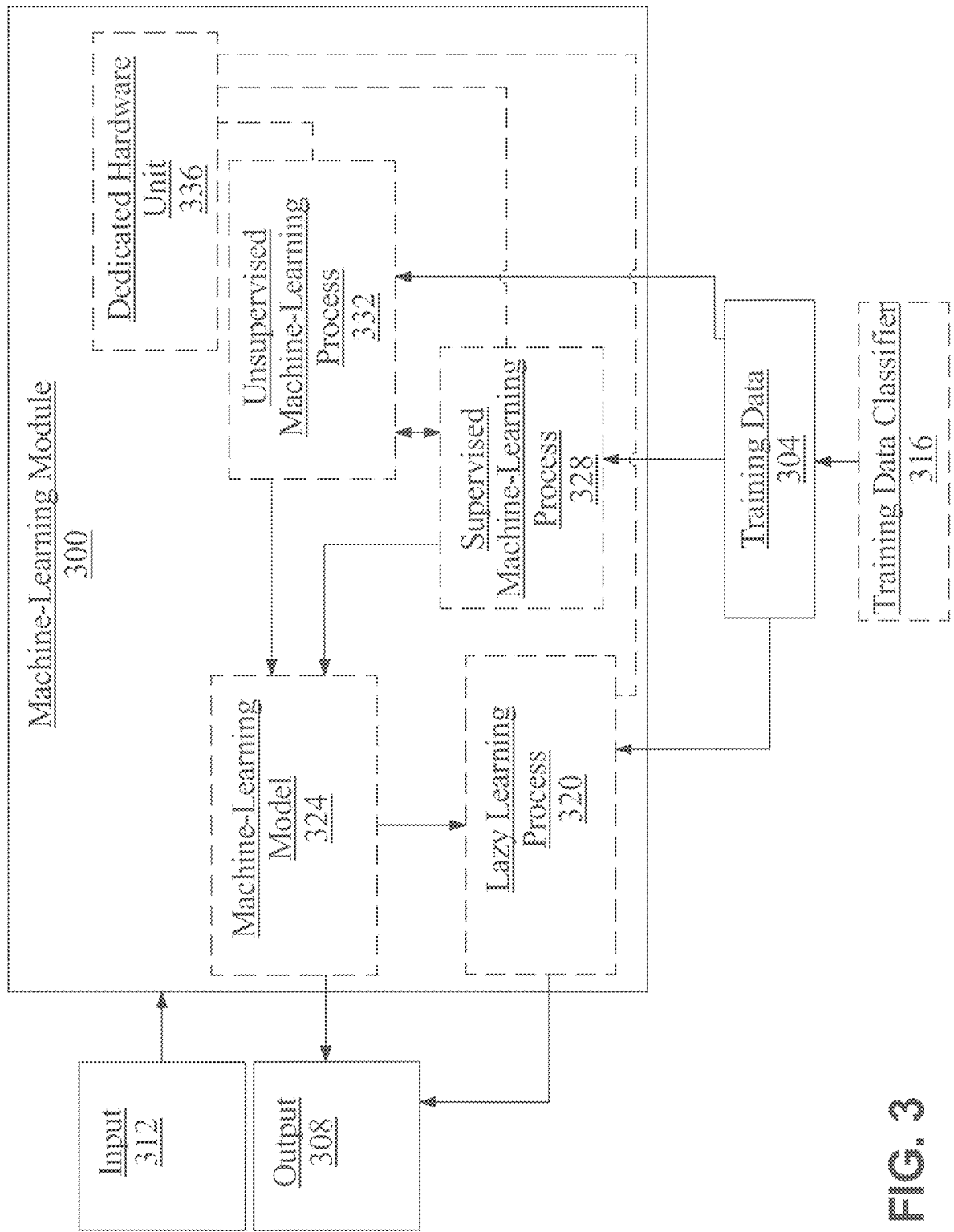
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include raw time-based service records containing session notes, timestamps, provider names, and service descriptions, while output data may include structured metadata objects with assigned descriptors (e.g., "speech therapy," "Medicaid-funded"), a computed constraint deviation metric indicating service delivery shortfall or overage relative to a temporal delivery threshold, or an output object configured for visualization or alert generation within the system's user interface.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to identify sub-populations such as provider role cohorts (e.g., paraprofessionals, licensed therapists), funding categories (e.g., Medicaid-funded vs. privately funded services), or service delivery contexts (e.g., school-based vs. in-home), enabling selection of relevant subsets of training data for domain-specific normalization, constraint evaluation, or utilization forecasting.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 3, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 3, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
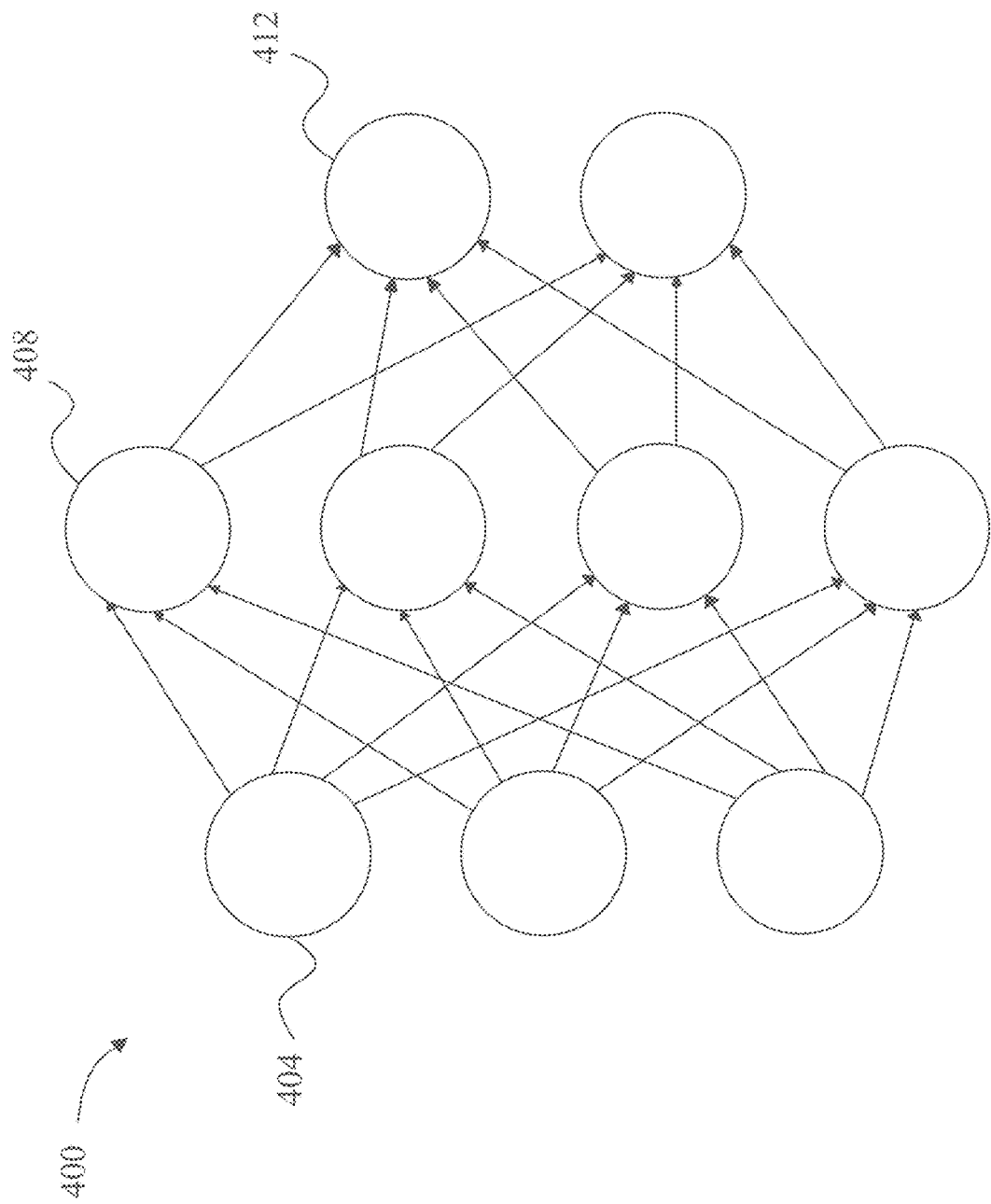
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
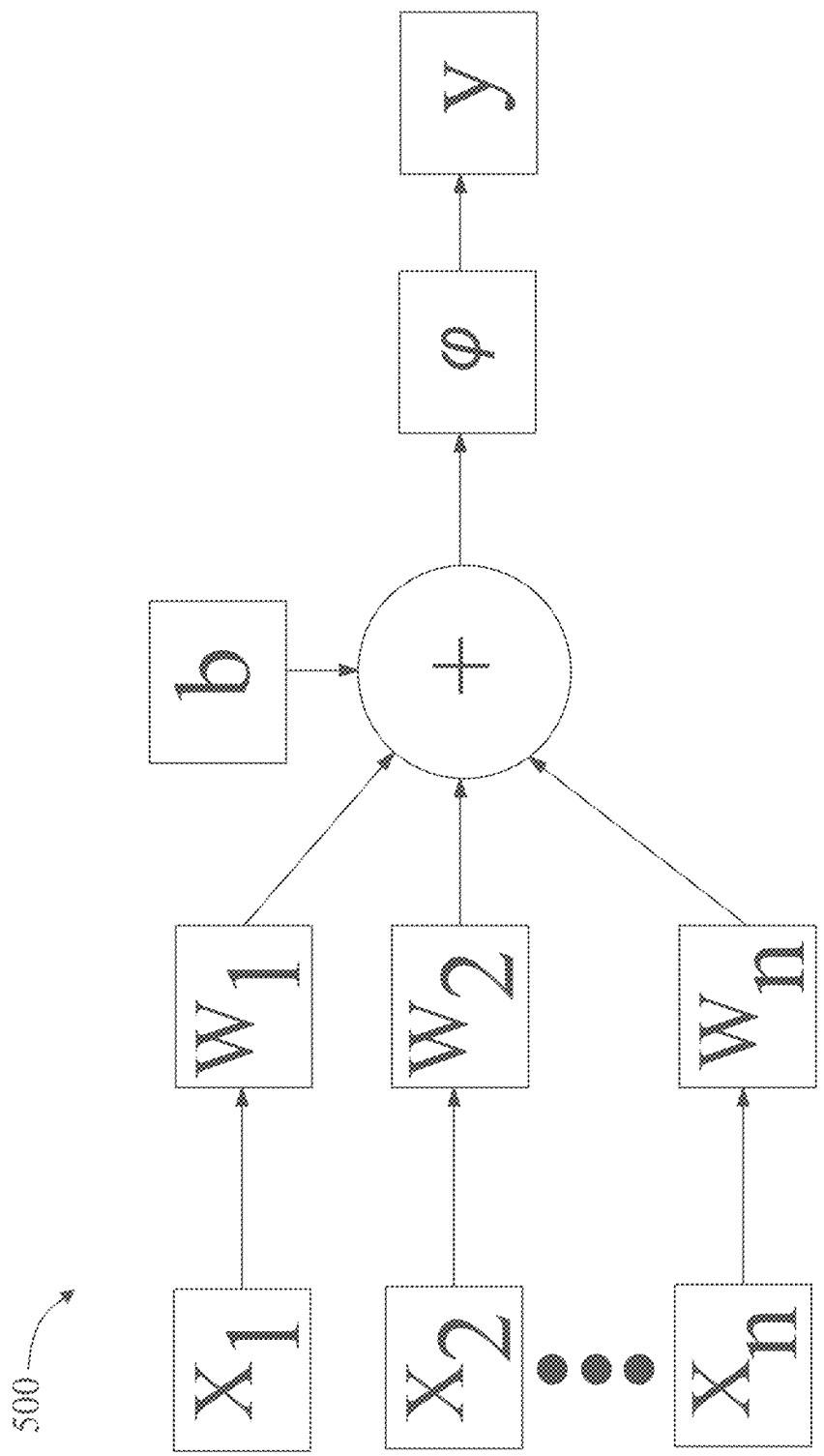
FIG. 5 is a diagram of an exemplary embodiment of a node of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, Wold is the previous weight value, α is a parameter to set the learning rate, and dJ/dw is the partial derivative of with respect to weight w.

Figure 6:
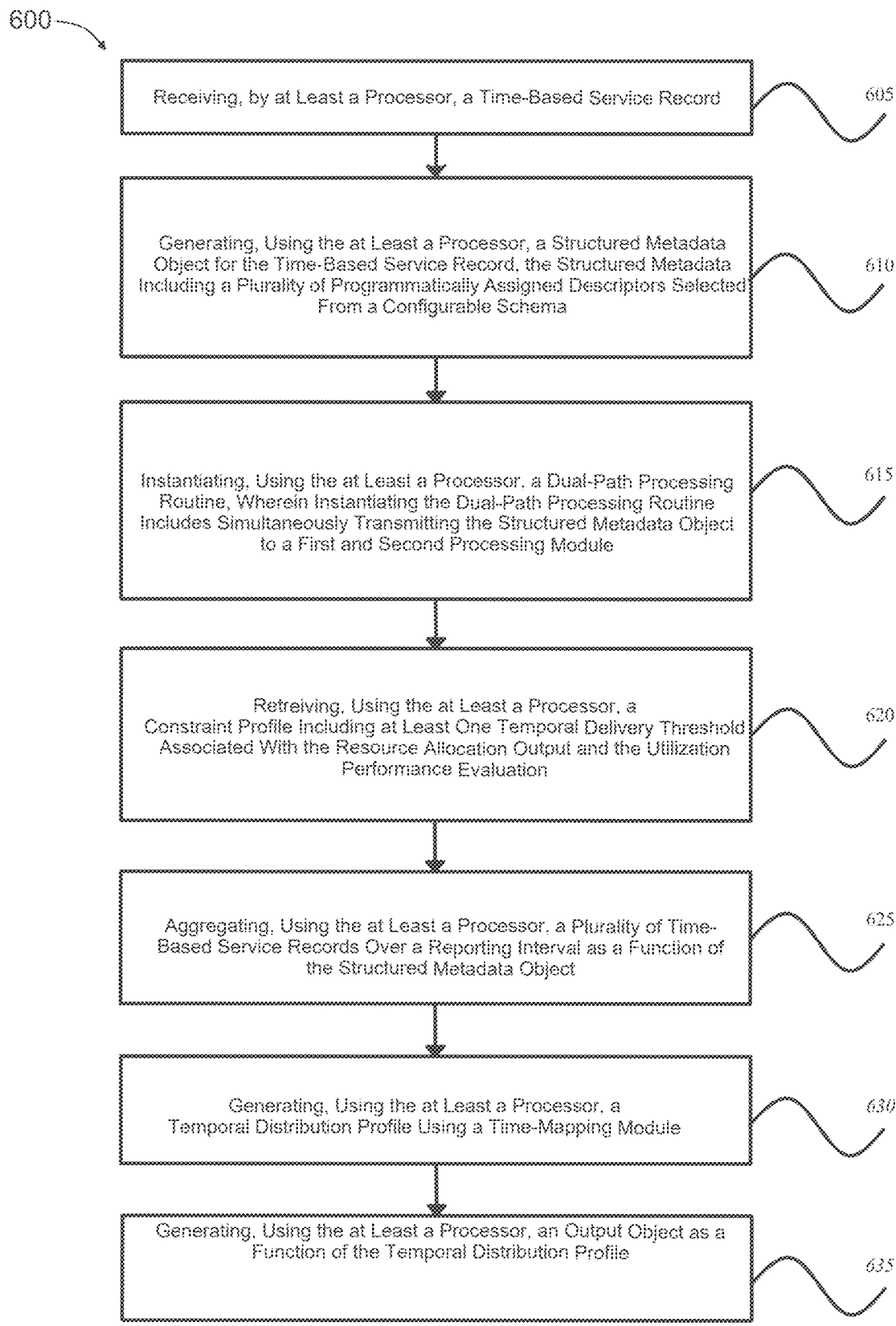
FIG. 6 is a flow diagram of an exemplary method for dual-path processing of time-based service records using structured metadata and threshold-based constraint validation.

Referring now to FIG. 6, an exemplary method 600 for dual-path processing of time-based service records using structured metadata and threshold-based constraint validation is illustrated. Method 600 may include a step 605 of receiving, at a user interface, a time-based service record. This may be implemented, without limitation, as referenced in FIGS. 1-5.

In continued reference to FIG. 6, method 600 may include a step 610 of generating, using at least a processor, a structured metadata object for the service record, the structured metadata object including a plurality of programmatically assigned descriptors selected from a configurable schema. In an embodiment, the configurable schema may include a set of routing parameters and method 600 may further include a step of selecting, using the programmatically assigned descriptors of the structured metadata object, the first and second processing modules as a function of the set of routing parameters. In an embodiment, the routing parameters may support conditional processing, and method 600 may further include a step of initially routing the structured metadata object to only one of the first and second processing modules, and storing the structured metadata object for subsequent processing by one or more of the first and second processing modules at a later time. This may be implemented, without limitation, as referenced in FIGS. 1-5.

With further reference to FIG. 6, method 600 may include a step 615 of instantiating, using the at least a processor, a dual-path processing routine, wherein instantiating the dual-path processing routine comprises transmitting the structured metadata object to a first processing module configured to compute a resource allocation output as a function of transformation logic defined in a precompiled configuration file and transmitting the structured metadata object to a second processing module configure to evaluate utilization performance by applying a set of domain-specific normalization rules. This may be implemented, without limitation, as referenced in FIGS. 1-5.

In further reference to FIG. 6, method 600 may include a step 620 of retrieving, using the at least a processor, a constraint profile comprising at least one temporal delivery threshold associated with the resource allocation output and the utilization performance evaluation. This may be implemented, without limitation, as referenced in FIGS. 1-5.

With further reference to FIG. 6, method 600 may include a step 625 of aggregating, using the at least a processor, time-based service records over a reporting interval as a function of the structured metadata. This may be implemented, without limitation, as referenced in FIGS. 1-5.

With continued reference to FIG. 6, method 600 may include a step 630 of generating, using the at least a processor, a temporal distribution profile using a time-mapping module. The time-mapping module may be configured to segment the reporting interval into time units, align each time-based service record of the plurality of time-based service records to the time units as a function of at least one structured metadata field, and compute a constrain deviation metric as a function of comparing the plurality of time-based serve records to the at least one temporal delivery threshold. This may be implemented, without limitation, as referenced in FIGS. 1-5.

In further reference to FIG. 6, method 600 may include a step 635 of generating, using the at least a processor, an output object as a function of the temporal distribution profile. This may be implemented, without limitation, as referenced in FIGS. 1-5.

With continued reference to FIG. 6, method 600 may further include a step of determining at least one time value associated with the time-based service record as a function of executing a timestamp resolution routine, wherein the timestamp resolution routine selects the time value as a function of at least a data source containing machine-readable data including a temporal association between a service-related activity and at least one stored system datum. This may be implemented, without limitation, as referenced in FIGS. 1-5.

In further reference to FIG. 6, method 600 may further include presenting, at the user interface, a dynamically generated list of candidate programmatically assigned descriptors, wherein generating the dynamically generated list comprises applying at least a selection algorithm to the structured metadata object, and receiving, at the user interface, a user selection of at least one programmatically assigned descriptors from the dynamically generated list. This may be implemented, without limitation, as referenced in FIGS. 1-5.

Still referring to FIG. 6, method 600 may further include selecting the set of domain-specific normalization rules as a function of at least a descriptor in the structured metadata object. This may be implemented, without limitation, as referenced in FIGS. 1-5.

With further reference to FIG. 6, method 600 may further include generating the constraint profile, wherein generating the constraint profile comprises: receiving, as input, a service document 174 including one or more delivery requirements associated with a service-related activity, inputting the service document 174 into a large language model (LLM), identifying, using the LLM, at least one delivery expectation expressed in natural language; mapping the at least one delivery expectation to a structured metadata field compatible with a constraint profile schema, and generating the constraint profile by populating one or more fields of the constraint profile schema with the at least a delivery expectation. This may be implemented, without limitation, as referenced in FIGS. 1-5.

In continued reference to FIG. 6, method 600 may further include receiving, by the at least a processor, an additional time-based service record, and updating, using the time-mapping module, the aggregation of time-based service records over the reporting interval as a function of the structured metadata object associated with the additional time-based service record. This may be implemented, without limitation, as referenced in FIGS. 1-5.

With continued reference to FIG. 6 method 600 may further include identifying, as a function of the constraint deviation metric, a service type and a corresponding time requirement, transmitting a query to a utilization support module, the query comprising one or more parameters representative of the corresponding time requirement and at least a provider assignment constraint, and generating, in response to the query, an alert comprising a configurable event entry configured to satisfy the corresponding time requirement. This may be implemented, without limitation, as referenced in FIGS. 1-5.

In further reference to FIG. 6 method 600 may further include displaying at the user interface, using one or more graphical elements, a visualization layer comprising a temporal service distribution profile spanning the reporting interval; and receiving, at the user interface, a user selection of a graphical segment corresponding to a particular time-based service record, and in response to the user selection, surfacing at least a service delivery record associated with the particular time-based service record. This may be implemented, without limitation, as referenced in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
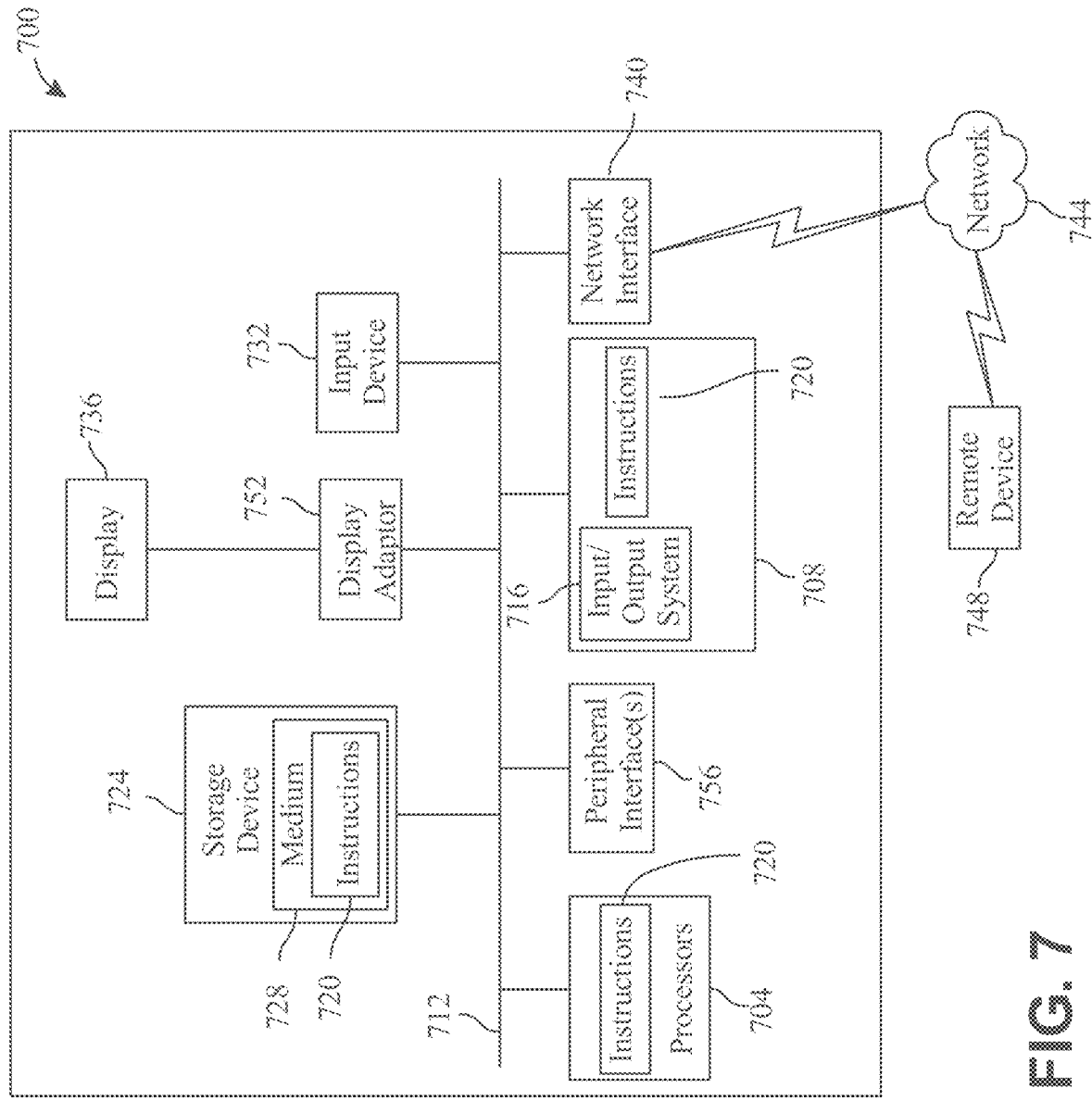
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for dual-path processing of time-based service records using structured metadata and threshold-based constraint validation, the system comprising:
   at least a processor; and
   a memory communicatively connected to the at least a processor, the memory containing instructions configuring the at least a processor to:
   receive, at a user interface, a time-based service record;
   generate a structured metadata object for the time-based service record, the structured metadata object comprising a plurality of programmatically assigned descriptors selected from a configurable schema;
   instantiate a dual-path processing routine, wherein the instantiating the dual-path processing routine comprises:
   transmitting the structured metadata object to a first processing module configured to compute a resource allocation output as a function of transformation logic defined in a precompiled configuration file; and
   transmitting the structured metadata object to a second processing module configured to evaluate utilization performance by applying a set of domain-specific normalization rules to the structured metadata object;
   generate a constraint profile comprising at least one temporal delivery threshold associated with the resource allocation output and the utilization performance evaluation, wherein the generating the constraint profile comprises:
   receiving, as input, a service document comprising one or more delivery requirements associated with a service-related activity;
   identifying at least one delivery expectation;
   mapping the at least one delivery expectation to a structured metadata field compatible with a constraint profile schema; and
   storing the constraint profile by populating one or more fields of the constraint profile schema with the at least one delivery expectation;
   aggregate a plurality of time-based service records over a reporting interval as a function of the structured metadata object;
   generate a temporal distribution profile using a time-mapping module, wherein the time-mapping module is configured to:
   segment the reporting interval into time units;
   align each time-based service record of the plurality of time-based service records to the time units as a function of at least a structured metadata field; and
   compute a constraint deviation metric as a function of comparing the plurality time-based service records to the at least one temporal delivery threshold; and
   generate an output object as a function of the temporal distribution profile.

2. The system of claim 1, wherein the at least a processor is further configured to determine at least one time value associated with the time-based service record as a function of executing a timestamp resolution routine, wherein the timestamp resolution routine selects the at least one time value as a function of at least a data source comprising a temporal association between a service-related activity and at least one stored system datum.

3. The system of claim 1, wherein:
   the configurable schema comprises a set of routing parameters; and
   the at least a processor is further configured to select, using the programmatically assigned descriptors of the structured metadata object, the first and second processing modules as a function of the set of routing parameters.

4. The system of claim 3, wherein the routing parameters support conditional processing, and wherein:
the at least a processor is further configured to initially route the structured metadata object to only one of the first and second processing modules; and
the at least a processor is further configured to store metadata associated with the structured metadata object for subsequent processing by one or more of the first and second processing modules at a later time.

5. The system of claim 1, wherein the user interface is configured to:
present a dynamically generated list of candidate programmatically assigned descriptors, wherein generating the dynamically generated list comprises applying at least a selection algorithm to the structured metadata object; and
receive a user selection of at least one programmatically assigned descriptors from the dynamically generated list.

6. The system of claim 1, wherein the set of domain-specific normalization rules is selected as a function of at least a programmatically assigned descriptor in the structured metadata object.

7. The system of claim 1, wherein the at least a processor is further configured to:
input the service document into a large language model (LLM); and
identify, using the LLM, the at least one delivery expectation expressed in natural language.

8. The system of claim 1, wherein the time-mapping module is further configured to:
receive an additional time-based service record and
update the aggregation of time-based service records over the reporting interval as a function of the structured metadata object associated with the additional time-based service record.

9. The system of claim 1, further comprising a utilization support module communicatively connected to the at least a processor, wherein the at least a processor is further configured to:
identify, as a function of the constraint deviation metric, a service type and a corresponding time requirement;
transmit a query to the utilization support module, the query comprising one or more parameters representative of the corresponding time requirement and at least a provider assignment constraint; and
generate, in response to the query, an alert comprising a configurable event entry configured to satisfy the corresponding time requirement.

10. The system of claim 1, wherein the user interface is configured to:
display, using one or more graphical elements, a visualization layer comprising a temporal service distribution profile spanning the reporting interval; and
receive a user selection of a graphical segment corresponding to a particular time-based service record; and
in response to the user selection, surface at least a service delivery record associated with the particular time-based service record.

11. A method for dual-path processing of time-based service records using structured metadata and threshold-based constraint validation, the method comprising:
receiving, at a user interface, a time-based service record;
generating, using at least a processor, a structured metadata object for the service record, the structured metadata object comprising a plurality of programmatically assigned descriptors selected from a configurable schema;
instantiating, using the at least a processor, a dual-path processing routine, wherein the instantiating the dual-path processing routine comprises:
transmitting the structured metadata object to a first processing module configured to compute a resource allocation output as a function of transformation logic defined in a precompiled configuration file; and
transmitting the structured metadata object to a second processing module configured to evaluate utilization performance by applying a set of domain-specific normalization rules to the structured metadata object;
generating, using the at least a processor, a constraint profile comprising at least one temporal delivery threshold associated with the resource allocation output and the utilization performance evaluation, wherein the generating the constraint profile comprises:
receiving, as input, a service document comprising one or more delivery requirements associated with a service-related activity;
identifying at least one delivery expectation expressed in natural language;
mapping the at least one delivery expectation to a structured metadata field compatible with a constraint profile schema; and
storing the constraint profile by populating one or more fields of the constraint profile schema with the at least one delivery expectation;
aggregating, using the at least a processor, a plurality of time-based service records over a reporting interval as a function of the structured metadata object;
generating, using the at least a processor, a temporal distribution profile using a time-mapping module, wherein the time-mapping module is configured to:
segment the reporting interval into time units;
align each time-based service record of the plurality of time-based service records to the time units as a function of at least one structured metadata field; and
compute a constraint deviation metric as a function of comparing the plurality time-based service records to the at least one temporal delivery threshold; and
generating, using the at least a processor, an output object as a function of the temporal distribution profile.

12. The method of claim 11, further comprising determining at least one time value associated with the time-based service record as a function of executing a timestamp resolution routine, wherein the timestamp resolution routine selects the at least one time value as a function of at least a data source comprising a temporal association between a service-related activity and at least one stored system datum.

13. The method of claim 11, wherein:
the configurable schema comprises a set of routing parameters; and
the method further comprises selecting, using the programmatically assigned descriptors of the structured metadata object, the first and second processing modules as a function of the set of routing parameters.

14. The method of claim 13, wherein the routing parameters support conditional processing, and wherein the method further comprises:
initially routing the structured metadata object to only one of the first and second processing modules; and storing the structured metadata object for subsequent processing by one or more of the first and second processing modules at a later time.

15. The method of claim 11, further comprising:
presenting, at the user interface, a dynamically generated list of candidate programmatically assigned descriptors, wherein generating the dynamically generated list comprises applying at least a selection algorithm to the structured metadata object; and
receiving, at the user interface, a user selection of at least one programmatically assigned descriptors from the dynamically generated list.

16. The method of claim 11, further comprising selecting the set of domain-specific normalization rules as a function of at least a programmatically assigned descriptor in the structured metadata object.

17. The method of claim 11, further comprising:
inputting the service document into a large language model (LLM); and
identifying, using the LLM, the at least one delivery expectation expressed in natural language.

18. The method of claim 11, further comprising:
receiving, by the at least a processor, an additional time-based service record; and
updating, using the time-mapping module, the aggregation of time-based service records over the reporting interval as a function of the structured metadata object associated with the additional time-based service record.

19. The method of claim 11, further comprising:
identifying, as a function of the constraint deviation metric, a service type and a corresponding time requirement;
transmitting a query to a utilization support module, the query comprising one or more parameters representative of the corresponding time requirement and at least a provider assignment constraint; and
generating, in response to the query, an alert comprising a configurable event entry configured to satisfy the corresponding time requirement.

20. The method of claim 11, further comprising:
displaying at the user interface, using one or more graphical elements, a visualization layer comprising a temporal service distribution profile spanning the reporting interval; and
receiving, at the user interface, a user selection of a graphical segment corresponding to a particular time-based service record; and
in response to the user selection, surfacing at least a service delivery record associated with the particular time-based service record.

\* \* \* \* \*